US012750818B2

(12) United States Patent
Lyazidi et al.

(10) Patent No.: US 12,750,818 B2
(45) Date of Patent: Sep. 29, 2026

(54) PAGING IN A WIRELESS COMMUNICATION NETWORK

(71) Applicant: Telefonaktiebolaget LM Ericsson (publ), Stockholm (SE)

(72) Inventors: Yazid Lyazidi, London (GB); Liwei Qiu, Täby (SE); Mattias Bergström, Sollentuna (SE); Andreas Höglund, Solna (SE); Tuomas Tirronen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 18/578,560

(22) PCT Filed: Jul. 12, 2022

(86) PCT No.: PCT/EP2022/069503

§ 371 (c)(1),
(2) Date: Jan. 11, 2024

(87) PCT Pub. No.: WO2023/285479

PCT Pub. Date: Jan. 19, 2023

(65) Prior Publication Data

US 2025/0008484 A1 Jan. 2, 2025

Related U.S. Application Data

(60) Provisional application No. 63/220,870, filed on Jul. 12, 2021.

(51) Int. Cl.
*H04W 68/02* (2009.01)

(52) U.S. Cl.
CPC .................................. *H04W 68/02* (2013.01)

(58) Field of Classification Search
CPC .................................................... H04W 68/02
(Continued)

(56) References Cited

U.S. PATENT DOCUMENTS 10,314,006 B2 * 6/2019 Wallentin .............. H04W 68/12
11,818,684 B2 * 11/2023 Johansson et al. . H04W 68/005
(Continued)

FOREIGN PATENT DOCUMENTS

EP 3046382 A1 * 7/2016 ............ H04W 36/16
EP 2903363 B1 8/2023
(Continued)

OTHER PUBLICATIONS

Ericsson , "RAN1 aspects for RAN2-led features for RedCap", 3GPP TSG RAN WG1 #105-e, R1-2104183, e-Meeting, May 19-27, 2021, 1-10.

(Continued)

*Primary Examiner* — Mahendra R Patel
(74) *Attorney, Agent, or Firm* — Murphy, Bilak & Homiller, PLLC

(57) ABSTRACT

A network node (12B) receives, from another network node (12A), an indication (14) of a type of, capability of, configuration of, and/or feature supported by a wireless communication device (16) to be paged. The indication (14) may for example indicate whether, or that, the wireless communication device (16) to be paged is a Reduced Capability, RedCap, User Equipment, UE. Regardless, the network node (12B) makes a paging decision (22) based on the received indication (14) and controls paging of the wireless communication device (16) according to the paging decision (22).

14 Claims, 8 Drawing Sheets

(58) Field of Classification Search
USPC .......................................................... 455/458
See application file for complete search history.

(56) References Cited

U.S. PATENT DOCUMENTS

| | | | | |
|---|---|---|---|---|
| 2019/0075511 | A1* | 3/2019 | Ryu | H04W 68/005 |
| 2020/0092685 | A1* | 3/2020 | Fehrenbach | H04W 72/23 |
| 2020/0229135 | A1* | 7/2020 | Ozturk et al. | H04W 68/005 |
| 2022/0030548 | A1* | 1/2022 | Chun | H04W 8/183 |
| 2022/0312530 | A1 | 9/2022 | Turtinen et al. | |
| 2023/0209431 | A1* | 6/2023 | Youn | H04W 8/082 455/432.1 |
| 2023/0247495 | A1 | 8/2023 | Teyeb et al. | |
| 2024/0114569 | A1 | 4/2024 | Wei et al. | |

FOREIGN PATENT DOCUMENTS

| | | | | |
|---|---|---|---|---|
| WO | WO-2016148617 | A1 * | 9/2016 | H04W 68/12 |
| WO | WO-2021045464 | A1 * | 3/2021 | H04W 76/20 |
| WO | 2022245270 | A1 | 11/2022 | |

OTHER PUBLICATIONS

Huawei , "(TP for NR BL CR for TS 38.473): on clarification to Initialul RRC Message Transfer procedure", 3GPP TSG RAN WG3 #101, R3-185095, Gothenburg, Sweden, Aug. 20-24, 2018, 1-4.

Huawei , et al., "Definition of RedCap UE type and reduced capabilities", 3GPP TSG RAN WG2 #114-e, R2-2105634, Electronic, May 19-27, 2021, 1-9.

Huawei , et al., "Discussion on W1AP Rrc Message Transfer procedures", 3GPP TSG RAN WG3 #103, R3-190616, Athens, Greece, Feb. 25-Mar. 1, 2019, 1-4.

Intel Corporation , "Further considerations of Network assigned subgrouping", 3GPP TSG RAN WG2 #114-e, R2-2105021, E-Meeting, May 19-27, 2021, 1-5.

ZTE , "pCR38473 for Support of extended DRX in CM-IDLE for NB-IoT/eMTCconnected to 5GC", 3GPP TSG RAN WG3 #104, R3-192305, Reno, Nevada, May 13-17, 2019, 1-9.

3GPP, "3GPP TR 38.875 V2.0.0", 3rd Generation Partnership Project; Technical Specification Group Radio Access Network; Study on support of reduced capability NR devices (Release 17), Mar. 2021, 1-135.

3GPP, "3GPP TS 38.401 V16.6.0", 3rd Generation Partnership Project; Technical Specification Group Radio Access Network; NG-RAN; Architecture description (Release 16), Jul. 2021, 1-79.

3GPP, "3GPP TS 38.473 V16.6.0", 3rd Generation Partnership Project; Technical Specification Group Radio Access Network; NG-RAN; F1 application protocol (F1AP) (Release 16), Jul. 2021, 1-463.

3GPP, "3rd Generation Partnership Project; Technical Specification Group Radio Access Network; NG-RAN; F1 application protocol (F1AP) (Release 16)", 3GPP TS 38.473 V16.5.0, Apr. 2021, 1-463.

3GPP, "3rd Generation Partnership Project; Technical Specification Group Radio Access Network; NR; Radio Resource Control (RRC) protocol specification (Release 16)", 3GPP TS 38.331 V16.5.0, Jun. 2021, 1-959.

3GPP, "3rd Generation Partnership Project; Technical Specification Group Radio Access Network; Study on support of reduced capability NR devices (Release 17)", 3GPP TR 38.875 V17.0.0, Mar. 2021, 1-135.

Ericsson "Revised WID on support of reduced capability NR devices", 3GPP TSG RAN Meeting #92e, RP-211574, Revision of RP-210918, Electronic Meeting, Jun. 14-18, 2021, 1-6.

3GPP, "3rd Generation Partnership Project; Technical Specification Group Radio Access Network; NG-RAN; NG Application Protocol (NGAP) (Release 16)", 3GPP TS 38.413 V16.5.0, Apr. 2021, 1-473.

Nokia, et al., "Revised WID on support of reduced capability NR devices", 3GPP TSG RAN Meeting #91e, RP-210918, Revision of RP-210894, Electronic Meeting, Mar. 22-26, 2021, 1-6.

* cited by examiner

PAGING IN A WIRELESS COMMUNICATION NETWORK

TECHNICAL FIELD

The present application relates generally to a wireless communication network and relates more particularly to paging in such a network.

BACKGROUND

A wireless communication device may connect to a wireless communication network, but thereafter release or suspend its radio connection, e.g., a Radio Resource Control (RRC) connection. The device may release or suspend its radio connection, for example, if the radio connection becomes idle or inactive (e.g., in RRC_IDLE mode or RRC_INACTIVE mode), such as when there is no data to be transmitted to or from the wireless communication device. If the network gets data to be transmitted to the wireless communication device, but the device does not have an active radio connection, the network pages the device to prompt the device to re-establish or resume its radio connection. The network may need to page the device over numerous cells or areas, depending on the granularity with which the network monitors the device's location while the device lacks an active radio connection. In this regard, even if the device does not have an active radio connection, the device still periodically monitors a control channel for paging messages. If the device receives a paging message, the device attempts to re-establish or resume a radio connection with the network.

Although paging allows a wireless communication device to release or suspend its radio connection when the connection becomes idle or inactive, paging nonetheless consumes radio resources. Moreover, paging consumes processing resources and power at wireless communication devices. This is true even for wireless communication devices that are not paged, since a wireless communication device may still need to receive and process a paging message in order to identify that the paging message is not addressed to it. These challenges prove particularly applicable with the introduction of Reduced Capability (RedCap) devices in New Radio (NR) networks, e.g., since paging messages targeting RedCap devices may need to be repeated numerous times given their lower maximum bandwidth.

SUMMARY

Some embodiments herein exploit cell barring information for making paging decisions, e.g., in order to reduce paging load and/or overhead. For example, some embodiments avoid paging a wireless communication device in a cell if the device is barred from accessing that cell. Other embodiments avoid requesting a network node to page a wireless communication device in a cell if the device is barred from accessing that cell. By making decisions about whether to page a device, or about in which cell to page a device, based on in which cells (if any) the device is barred from accessing, these and other embodiments advantageously avoid unnecessary transmission of paging messages. This in turn conserves radio resources, as well as processing resources and power at wireless communication devices.

In the context of RedCap UEs, for example, some embodiments avoid paging a RedCap UE in a cell if RedCap UEs are barred from accessing that cell. Other embodiments avoid requesting a network node to page a RedCap UE in a cell if RedCap UEs are barred from accessing that cell.

Generally, though, embodiments herein include a method performed by a network node. The method comprises receiving, from another network node, an indication of a type of, capability of, configuration of, and/or feature supported by a wireless communication device to be paged.

In some embodiments, the method also comprises making a paging decision based on the received indication. In this case, the method may also comprise controlling paging of the wireless communication device according to the paging decision.

In some embodiments, the paging decision is a decision as to at least whether the wireless communication device is, or is not, to be paged. In other embodiments, the paging decision is a decision as to at least whether the wireless communication device is, or is not, to be paged in a certain cell. In yet other embodiments, the paging decision is a decision as to at least, in which one or more cells, if any, the wireless communication device is or is not to be paged. In yet other embodiments, the paging decision is a decision as to at least whether to request another network node to page the wireless communication device.

In some embodiments, the paging decision is a decision as to in which one or more cells, if any, the wireless communication device is or is not to be paged. In some embodiments, said controlling comprises paging the wireless communication device in one or more cells in which the wireless communication device is to be paged according to said decision. In other embodiments, said controlling alternatively or additionally comprises refraining from paging the wireless communication device in one or more cells in which the wireless communication device is not to be paged according to said decision.

In some embodiments, the paging decision is a decision as to whether to request another network node to page the wireless communication device. In this case, the method further comprises requesting, or refraining from requesting, the another network node to page the wireless communication device according to the decision.

In some embodiments, the paging decision is made based also on information. The information indicates whether or not wireless communication devices that have the type, capability, configuration, and/or feature indicated by said indication are allowed or able to camp on, access, or attempt access to one or more certain cells. In other embodiments, information additionally or alternatively indicates in which one or more cells wireless communication devices that have the type, capability, configuration, and/or feature indicated by said indication are, or are not, allowed or able to camp on, access, or attempt access.

In some embodiments, receiving the indication comprises receiving a paging message that requests the network node to page the wireless communication device, wherein the indication is included in the paging message. In some embodiments, the indication comprises, or is included in, a UE Radio Capability for Paging information element.

In some embodiments, the indication indicates whether, or that, the wireless communication device to be paged is a Reduced Capability, RedCap, User Equipment, UE. In some embodiments, making the decision comprises making the decision to page the wireless communication device in a cell served by the network node if the indication indicates the wireless communication device is a RedCap UE and if RedCap UEs are allowed or able to camp on, access, or attempt access in the cell. In other embodiments, making the decision alternatively comprises making the decision to refrain from paging the wireless communication device in a cell served by the network node if the indication indicates the wireless communication device is a RedCap UE and if RedCap UEs are not allowed or able to camp on, access, or attempt access in the cell. In some embodiments, making the decision comprises making the decision to request another network node to page the wireless communication device in a cell served by the another network node if the indication indicates the wireless communication device is a RedCap UE and if RedCap UEs are allowed or able to camp on, access, or attempt access in the cell. In other embodiments, making the decision alternatively comprises making the decision to refrain from requesting another network node to page the wireless communication device in a cell served by the another network node if the indication indicates the wireless communication device is a RedCap UE and if RedCap UEs are not allowed or able to camp on, access, or attempt access in the cell.

Other embodiments herein include a method performed by a network node. The method comprises transmitting, to another network node, an indication of a type of, capability of, configuration of, and/or feature supported by a wireless communication device to be paged.

In some embodiments, transmitting the indication comprises transmitting a paging message that requests the another network node to page the wireless communication device. In some embodiments, the indication is included in the paging message. In some embodiments, the indication comprises, or is included in, a UE Radio Capability for Paging information element.

In some embodiments, the indication indicates whether, or that, the wireless communication device to be paged is a Reduced Capability, RedCap, User Equipment, UE.

In some embodiments, the method further comprises transmitting, to the another network node, information. The information indicates whether or not wireless communication devices that have the type, capability, configuration, and/or feature indicated by said indication are allowed or able to camp on, access, or attempt access to one or more certain cells. In other embodiments, the information alternatively or additionally indicates in which one or more cells wireless communication devices that have the type, capability, configuration, and/or feature indicated by said indication are, or are not, allowed or able to camp on, access, or attempt access. In some embodiments, the information indicates whether or not wireless communication devices that are Reduced Capability, RedCap, User Equipments, UEs, are allowed or able to camp on, access, or attempt access to one or more certain cells. In other embodiments, the information alternatively or additionally indicates in which one or more cells wireless communication devices that are RedCap UEs are, or are not, allowed or able to camp on, access, or attempt access.

Other embodiments herein include a network node. The network node is configured to receive, from another network node, an indication of a type of, capability of, configuration of, and/or feature supported by a wireless communication device to be paged. In some embodiments, the network node is also configured to make a paging decision based on the received indication. In this case, the network node may also be configured to control paging of the wireless communication device according to the paging decision.

In some embodiments, the network node is configured to perform the steps described above for a network node.

Other embodiments herein include a network node. The network node is configured to transmit, to another network node, an indication of a type of, capability of, configuration of, and/or feature supported by a wireless communication device to be paged.

In some embodiments, the network node is configured to perform the steps described above for a network node.

In some embodiments, a computer program comprising instructions which, when executed by at least one processor of a network node, causes the network node to perform the steps described above for a network node. In some embodiments, a carrier containing the computer program is one of an electronic signal, optical signal, radio signal, or computer readable storage medium.

Other embodiments herein include a network node. The network node comprises communication circuitry and processing circuitry The processing circuitry is configured to receive, from another network node, an indication of a type of, capability of, configuration of, and/or feature supported by a wireless communication device to be paged. In some embodiments, the processing circuitry is also configured to make a paging decision based on the received indication. In this case, the processing circuitry may also be configured to control paging of the wireless communication device according to the paging decision.

In some embodiments, the processing circuitry is configured to perform the steps described above for a network node.

Other embodiments herein include a network node. The network node comprises communication circuitry and processing circuitry The processing circuitry is configured to transmit, to another network node, an indication of a type of, capability of, configuration of, and/or feature supported by a wireless communication device to be paged.

In some embodiments, the processing circuitry is configured to perform the steps described above for a network node.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
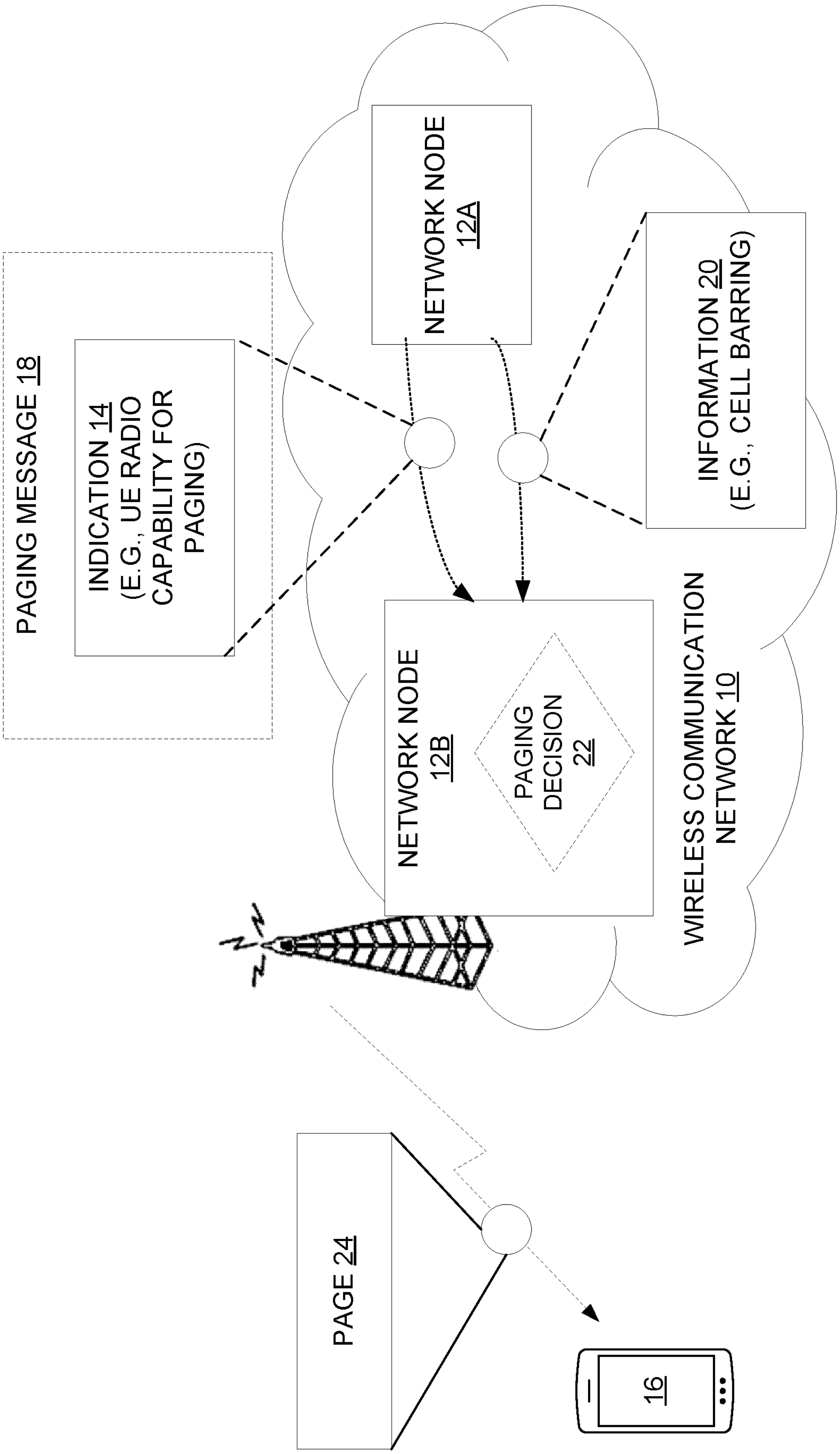
FIG. 1 is a block diagram of a wireless communication network according to some embodiments.

FIG. 1 shows a wireless communication network 10 according to some embodiments. As depicted, network node 12A transmits an indication 14 to network node 12B. The indication 14 indicates a type of, capability of, configuration of, and/or feature supported by a wireless communication device 16 to be paged. In some embodiments, for example, network node 12A transmits a paging message 18 to network node 12B, e.g., requesting network node 12B to page the wireless communication device 16, with the indication 14 included in the paging message 18. In these and other embodiments, the indication 14 may be, or be comprised in, a UE Radio Capability for Paging information element (IE).

Alternatively or additionally, FIG. 1 shows network node 12A transmits information 20 to network node 12B, e.g., in paging message 18. In some embodiments, the information 20 indicates whether or not wireless communication devices that have a certain type, capability, configuration, and/or feature are allowed or able to camp on, access, or attempt access to one or more certain cells. Alternatively or additionally, the information 20 may indicate in which one or more cells wireless communication devices that have a certain type, capability, configuration, and/or feature are, or are not, allowed or able to camp on, access, or attempt access. For example, in some embodiments, the information 20 takes the form of cell barring information, indicating in which one or more cells wireless communication devices that have a certain type, capability, configuration, and/or feature are not allowed to camp on, access, or attempt access.

According to some embodiments, network node 12B exploits the indication 14 and/or the information 20 for making a paging decision 22 concerning paging of the wireless communication device 16. Network node 12B in this regard makes a paging decision 22 based on the indication 14 and/or the information 20. For example, the paging decision 22 may be a decision as to (i) whether the wireless communication device 16 is, or is not, to be paged; (ii) whether the wireless communication device 16 is, or is not, to be paged in a certain cell; (iii) in which one or more cells, if any, the wireless communication device 16 is or is not to be paged; and/or (iv) whether to request another network node to page the wireless communication device 16.

Regardless of the particular nature of the paging decision 22, network node 12B may correspondingly control paging of the wireless communication device 16 according to the paging decision 22. For example, network node 12B may transmit, or not transmit, a page 24 to the wireless communication device 16 in accordance with the paging decision 22. Or, network node 12B may request, or not request, another network node to transmit a page 24 to the wireless communication device 16 in accordance with the paging decision 22.

As one example, network node 12B may decide that the wireless communication device 16 is to be paged in the certain cell if the information 20 indicates that wireless communication devices that have the type, capability, configuration, and/or feature indicated by the indication 14 are allowed or able to camp on, access, or attempt access to the certain cell. On the other hand, network node 12B may decide that the wireless communication device 16 is not to be paged in the certain cell if the information 20 indicates that wireless communication devices that have the type, capability, configuration, and/or feature indicated by the indication 14 are not allowed or able to camp on, access, or attempt access to the certain cell. Network node 12B may correspondingly page or not page the wireless communication device 16 in the certain cell according to the decision. In some embodiments, network node 12B decides this on a cell by cell basis, e.g., for each of one or more cells served by network node 12B.

Consider now a specific example in the context of Reduced Capability (RedCap) devices. In some embodiments, the indication 14 indicates that the wireless communication device 16 to be paged is a RedCap user equipment (UE) and/or the information 20 indicates cell(s) in which RedCap UEs are barred from access. Network node 12B may correspondingly decide that the wireless communication device 16 (a RedCap UE in this example) is to be paged in a cell if the information 20 indicates that RedCap UEs are allowed to camp on, access, or attempt access to the cell. On the other hand, network node 12B may decide that the wireless communication device 16 is not to be paged in a cell if the information 20 indicates that RedCap UEs are not allowed to camp on, access, or attempt access to the cell. Network node 12B may correspondingly page or not page the wireless communication device 16 in a cell according to the decision.

By making decisions about whether to page the wireless communication device 16, or about in which cell to page the wireless communication device 16, based on in which cells (if any) the wireless communication device 16 is barred from accessing, these and other embodiments advantageously avoid unnecessary transmission of paging messages. This in turn conserves radio resources, as well as processing resources and power at wireless communication devices.

Consider now some additional details of embodiments herein in an example context, e.g., where the wireless communication device 16 is exemplified as a user equipment (UE).

In some embodiments herein, paging may be initiated by a radio access network (RAN) or by a core network (CN).

Consider an example where paging can be initiated by the radio access network. RRC INACTIVE is a state wherein from a RAN point of view, the UE does not have an active connection with the network, but from a core network point of view, the UE is in CONNECTED. If the core network receives downlink data for the UE the core network would therefore do the same thing it does for a UE in RRC CONNECTED, namely send the data to the RAN node which the core network thinks is in connection with the UE. However, as explained, the RAN node does not have an active connection with the UE. The RAN node will therefore initiate a paging procedure for the UE. The RAN node will not only send the page itself, but it will also request other RAN nodes to page the UE.

The RAN and/or CN according to some embodiments may be, or evolve from, the 5G system (5GS). The 5GS includes both a new radio access network (NG-RAN) which makes use of a new air interface called New Radio (NR), and a new core network (5GC).

The initial release of 5G in Release 15 is optimized for mobile broadband (MBB) and ultra-reliable and low latency communication (URLLC). These services require very high data rates and/or low latency and therefore put high requirements on the user equipment (UE). To enable 5G to be used for other services with more relaxed performance requirements, a new low complexity UE-type is introduced in Release 17, called 'reduced capability NR devices' or RedCap. The low complexity UE-type is particularly suited for machine type communication (MTC) services such as wireless sensors or video surveillance, but it can also be used for MBB services with lower performance requirements such as wearables. The low complexity UE in Rel-17 has reduced capabilities compared to a Release 15 New Radio (NR) UE. See, e.g., the Rel-17 work item description in RP-210918. Because of the reduced capabilities, the low complexity UE is sometimes also referred to as an NR RedCap UE.

A RedCap UE may for example be defined by the support of a maximum UE bandwidth of 20 MHZ (in FR1) or 100 MHZ (in FR2), possible support of only one multiple-input multiple-output (MIMO) layer and/or only one Rx antenna branch, support for 64QAM in the downlink (with 256QAM being optional), and half-duplex frequency division duplexing (HD-FDD) operation within one carrier.

In some embodiments herein, a RedCap UE may be as described below. A RedCap UE may for instance have a reduced maximum UE bandwidth. For example, the maximum bandwidth of a frequency range 1 (FR1) RedCap UE during and after initial access may be 20 MHz and/or the maximum bandwidth of a frequency range 2 (FR2) RedCap UE during and after initial access may be 100 MHz. Alternatively or additionally, a RedCap UE may have a reduced minimum number of receive (Rx) branches. For example, for frequency bands where a legacy NR UE is required to be equipped with a minimum of 2 Rx antenna ports, the minimum number of Rx branches supported by specification for a RedCap UE may be 1. The specification may also support 2 Rx branches for a RedCap UE in these bands. Or, for frequency bands where a legacy NR UE (other than 2-Rx vehicular UE) is required to be equipped with a minimum of 4 Rx antenna ports, the minimum number of Rx branches supported by specification for a RedCap UE may be 1. The specification in this case also supports 2 Rx branches for a RedCap UE in these bands. Alternatively or additionally, a RedCap UE may have a reduced maximum number of downlink (DL) multiple-input multiple-output (MIMO) layers. For example, for a RedCap UE with 1 Rx branch, 1 DL MIMO layer is supported. Or, for a RedCap UE with 2 Rx branches, 2 DL MIMO layers are supported. Alternatively or additionally, a RedCap UE may have a relaxed maximum modulation order. For example, for an FR1 RedCap UE, support of 256QAM in the downlink (DL) is optional (instead of mandatory). In one embodiment, no other relaxations of maximum modulation order are specified for a RedCap UE. Alternatively or additionally, a RedCap UE may support half-duplex frequency division duplexing (FDD) type A with minimum specification impact. (Note that FD-FDD and TDD are also supported.)

An NR RedCap UE may have some or all of the reduced capabilities above.

In some embodiments, a RedCap UE type may be defined to include capabilities for RedCap UE identification and for constraining the use of those RedCap capabilities only for RedCap UEs, and preventing RedCap UEs from using capabilities not intended for RedCap UEs including at least carrier aggregation, dual connectivity and wider bandwidths. In some embodiments, functionality is specified to enable RedCap UEs to be explicitly identifiable to the network through an early indication in a random access procedure, e.g., in Msg1 and/or Msg3, and Msg A if supported, including the ability for the early indication to be configurable by the network.

In some situations, e.g., high load, a cell in a network may not be able to, or may not prefer, to serve UEs. The network can therefore bar the UEs which results in that UEs will not camp on nor connect to that cell. Barring is achieved by the cell broadcasting an indication which tells the UE that the cell is barred for them.

RedCap UEs may consume more resources compared to regular UEs. For example, due to that they have limited capabilities such as lower maximum bandwidth, requires repetitions of certain messages/signals/etc. In some embodiments, the network can send an indication in system information which indicates if the cell accepts that RedCap UEs connect to a cell. If a RedCap UE sees that a cell indicates that it does not accept RedCap UEs, the RedCap UE shall not attempt to connect to the cell. The indication can be specific to certain RedCap UE features such as support of 1 Rx or 2 Rx branches. In these and other embodiments, system information may include an indication to indicate whether a RedCap UE can camp on the cell/frequency or not.

Some embodiments address certain challenge(s) in this context. If a cell bars a particular type of UE, e.g., a RedCap UE, there will be no RedCap UEs which camp on the cell. According to some embodiments, the network avoids paging such UEs, so as to conserve radio resources and avoid wasting UE power (since there may be other UEs which are not barred from the cell and those UEs would receive an indication of the page which costs UE power).

Generally, then, the network 10 in some embodiments refrains from paging UEs in a cell (e.g., UEs of a certain type) if those UEs are barred from the cell. Network radio resources are not wasted on paging unnecessarily for UEs which are barred in a cell. And UEs' power consumption is not wasted on receiving paging which are not for themselves.

According to some embodiments, a network 10 will page UEs of a certain type but only in cells where barring of such UEs is not enabled. The network 10 determine whether a UE 16 which shall be paged is of a type which is barred from a cell. If that is the case, the network 10 refrains from paging the UE 16 in that cell, while still page the UE 16 in other cells (if not barred in those cells).

For example, the network 10 may bar RedCap UEs from cells. If RedCap UEs are barred from a cell, that means that they are not allowed to camp on the cell. The network 10 according to embodiments herein exploits this by refraining from paging RedCap UEs in cells where RedCap UEs are barred.

Note that some embodiments herein are exemplified in terms of particular UE-types (e.g., the RedCap UE-type). However, embodiments herein are applicable to any UE-type as long as that UE-type can be barred from cells (or otherwise forbidden from camping on certain cells). Other example UE-types include UEs applying certain coverage enhancements techniques, UEs which are connected to certain core network, etc.

Also, the network 10 is described as barring UEs of certain types. Barring is a feature where the network 10 indicates (e.g., in system information) whether UEs are allowed to camp on a cell or not. However, embodiments are applicable to other mechanisms which restrict a UE's possibility to camp on a cell or make access attempt to the network 10 in the cell. For example, certain UE-types may require that a cell has a certain property in order for them to camp on the cell. The property may for example be that the cell applies a certain parameter, feature, etc. This means that while the UE may not explicitly be forbidden/barred from camping on a cell, the UE is not able to camp on the cell given certain parameter settings/features/etc. Embodiments herein are applicable also to that scenario. An example of such could for example be closed subscription group (CSG) or non-public networks (NPN).

Note further that it is described how UEs of a certain type can be barred from accessing a cell, and that the network 10 would refrain from paging UEs of that type in cells where that UE-type is barred. However, there may be multiple different types of UEs, and combinations of them. For example, there may be a UE-type A and UE-type B, meaning that there may be four categories of UEs:

UEs which are of UE-type A of UE-type B

UEs which are of UE-type A but not UE-type B

UEs which are not of UE-type A but are of UE-type B

UEs which are not of UE-type A and not of UE-type B

In scenarios where there are multiple types of UEs, it may be so that these different UE-types are barred individually, e.g., type A UEs may be barred but type B UEs are not, or type A UEs and type B UEs are both barred, or type A and type B UEs are both not barred.

In one embodiment, the network 10 considers the combination of UE-types that apply for a certain UE 16. For example, if the UE 16 is of type A and type B, the network 10 would refrain from paging this UE 16 in any cell which are barring type A UEs and cells which are barring type B UEs, or cells which bar both type A and type B UEs.

In the remainder of the description, it may be used as example the scenario where there is only one UE-type defined which can be barred from cells. However, that is just an example and it is possible to apply these embodiments for scenarios where there are multiple UE-types.

RAN Centric Approach

Below is described a RAN centric approach for how to implement some embodiments herein. Methods will be described which may be applied for core network-initiated paging and methods which may be applied for RAN-initiated paging.

Core Network-Initiated Paging

One way to implement some embodiments is that a RAN node will determine whether a cell is barring UEs of a UE-type A. If that is the case, the RAN node would not page UEs of type A in such a cell. Instead, the RAN node would only page UEs in those cells which allow UEs of type A.

It should be noted that one RAN node may host several cells and these cells independently bar/allow UEs of type A. Hence, the RAN node may send the page in a subset of the cells which it is hosting.

To enable this embodiment, the RAN node may need to receive an indication of which UE-type the UE 16 has. For example, the RAN node would determine if a page is for a RedCap UE or for a non-RedCap UE. That information may be received from a core network node, e.g., the one that requested the paging (which may be an Access and Mobility Function (AMF), Mobility Management Entity (MME), etc.). In one example the relevant UE property, e.g., the UE being of RedCap type, is included in the 'UE Radio Capability for Paging' which is included in the paging message from AMF to gNB. Based on this indication, and whether RedCap access is barred in the cell, gNB will determine if it should page the UE in the cell or not. In this case, then, wireless communication device 16 in FIG. 1 is exemplified by the UE, network node 12A is exemplified by a core network node such as the AMF, network node 12B is exemplified by the gNB/RAN node, indication 14 is exemplified by the 'UE Radio Capability for Paging', and the paging decision 22 is a decision by the gNB/RAN node about whether to transmit the page 24 to the wireless communication device 16.

RAN-Initiated Paging

When a UE is in RRC INACTIVE mode, the UE is from the core network's point of view in CONNECTED mode. However, from a RAN point of view, the UE does not have an active RRC connection with the RAN, instead the UE is in some aspects more like in IDLE mode where the UE is selecting cells which it camps on based on rules defined in the UE. The UE can only be within a so-called RAN area. A RAN area is a set of cells wherein the UE can move between while remaining in INACTIVE mode. The RAN area is defined by a RAN area code.

If downlink data is to be sent to the UE, the core network sends that data towards the last known RAN node. That RAN node would, if the UE is in INACTIVE mode, page the UE so the UE enters CONNECTED mode. Such paging needs to be done in all cells in the whole RAN area. That last known RAN node may therefore page the UE in the cell that it hosts, but also indicate to other RAN nodes in the RAN area that they should page the UE. In the subsections below it is described how embodiments can be applied for RAN-initiated paging.

Last Known Cell Skips Paging

If embodiments are applied to the INACTIVE scenario, the last known RAN node may, when it pages the UE in its own cells, page only on those cells wherein the UE is allowed (based on its UE-type). As applied to this case, wireless communication device 16 in FIG. 1 is exemplified by the UE, network node 12A is exemplified by the AMF, network node 12B is exemplified by the gNB/RAN node serving the last known cell, and the paging decision 22 is a decision by the gNB/RAN node serving the last known cell about whether to transmit the page 24 to the wireless communication device 16 in its own cells.

Further, the last known RAN node may request other RAN nodes in the RAN area to also page the UE. Those other RAN nodes may page the UE only in the cells in which the UE is allowed (described below).

The last known RAN node may determine whether the UE-type is barred from all cells of another RAN node. If that is the case the last known RAN node may refrain from requesting that another RAN node to page the UE altogether. As applied to this case, wireless communication device 16 in FIG. 1 is exemplified by the UE, network node 12B is exemplified by the gNB/RAN node serving the last known cell, and the paging decision 22 is a decision by the gNB/RAN node serving the last known cell about whether to request another network node (not shown) to transmit the page 24 to the wireless communication device 16.

The last known RAN node may receive information from the other RAN nodes in the RAN area of which types of UEs they allow and which types of UEs they bar. This may be signaled on an interface between the nodes, such as the Xn-interface or X2-interface.

Other RAN Nodes Skip Paging

Above it was described how the last known RAN node (i.e., the RAN node which initiates the paging) is determining which nodes the other RAN nodes should page the UE in. In other embodiments, by contrast, instead the other RAN nodes will decide if/which cells the UE is to be paged in.

In one embodiment, when a RAN node is requested to page a UE, it would decide whether they page the UE or not, and in which cells, based on the information from the last known RAN node (i.e., anchor gNB) of whether the UE is of RedCap type and which cell barring is applied for RedCap in these cells. For example, the last known RAN node may request a RAN node to page a UE and that RAN node may have barred the type of UE that is to be paged in one or more cells. The RAN node can then refrain from paging the UE in the cells where the UE is barred, while paging the UE in other cells.

To achieve this, the last known RAN node may indicate to the other RAN nodes that the paging request is for a UE of a certain type. The other RAN nodes can, based on this indication and based on whether they bar that type of UE in their cells, refrain from page the UE in cells where the UE-type is barred.

As applied to this case, then, wireless communication device 16 in FIG. 1 is exemplified by the UE, network node 12A is exemplified by the gNB/RAN node serving the last known cell, network node 12B is exemplified by the gNB/RAN node requesting to page the UE, and the paging decision 22 is a decision by the gNB/RAN node requested to page the UE about whether to transmit the page 24 to the wireless communication device 16.

Core Network Centric Approach

Other embodiments herein include a core network centric approach. The core network (e.g., an AMF entity, MME entity, etc.) would determine which nodes/cells a UE shall be paged. The core network node determines this based on whether the UE is of a certain UE-type and based on information about which cells bar UEs of that certain type.

In one embodiment, when the UE context is released from a RAN node (e.g., from a gNB-CU node), the RAN node sends a new paging assistance information to the core network, e.g., as an example of information 20 in FIG. 1. The information may be signaled from the RAN node to the core network over an NG-AP interface. This paging assistance data can include the list of cells where RedCap UEs are barred and cells where they are allowed.

In one embodiment, the core network includes in the NG PAGING message sent to the RAN (e.g., the gNB-CU) a list of cells where RedCap UEs can be paged and/or a list of cells barring RedCap UEs, e.g., as an example of information 20 in FIG. 1. The gNB-CU can then determine in which cells the RedCap UE is not allowed to camp and decide not to page RedCap UEs in such cells. This ensures that unnecessary paging messages are not sent over the radio interface.

In another embodiment, a timer can be added in the list of allowed cells for paging RedCap UEs to indicate for how long the RedCap UE should be allowed in those cells. In one version of this embodiment, absence of this timer can be interpreted that the RedCap can always be allowed in those cells.

In another embodiment, a timer can be added in the list of restricted cells for paging RedCap UEs to indicate for how long the RedCap UE should be barred from those cells. In one version of this embodiment, absence of this timer can be interpreted that the RedCap must always be barred from those cells This embodiment can be implemented by re-using, or extending, the received Assistance Data for paging IE over the NG-AP interface during previous UE context release message. An example implementation is shown below. The below shows an excerpt from 3GPP TS 38.413. Added parts compared to the current specification is shown with underlined wording.

9.3.1.69 Assistance Data for Paging

This IE provides assistance information for paging optimisation.

| IE/Group Name | Presence | Range | IE type and reference | Semantics description | Criticality | Assigned Criticality |
|---|---|---|---|---|---|---|
| Assistance Data for Recommended Cells | O | | 9.3.1.70 | | — | |
| Paging Attempt Information | O | | 9.3.1.72 | | — | |
| NPN Paging Assistance Information | O | | 9.3.1.183 | | YES | ignore |
| Paging Assistance Data for CE Capable UE | O | | 9.3.1.141 | | YES | ignore |
| Paging Assistance Data for RedCap UE (new) | O | | 9.3.1.xx | | YES | ignore |

9.3.1.xx Paging Assistance Data for RedCap UE (New)

This IE provides Assistance Data for paging RedCap UE.

| IE/Group Name | Presence | Range | IE type and reference | Semantics description |
|---|---|---|---|---|
| Allowed Cell List | | 0 . . . 1 | | |
| >Allowed Cell Item | | 1 . . . <maxnoofAllowedCells> | | |
| >>NG-RAN CGI | M | | 9.3.1.73 | |
| >>timer | O | | | Indicates how long the redcap UEs can be allowed in those cells |
| Restricted Cell List | | 0 . . . 1 | | |
| >Restricted Cell Item | | 1 . . . <maxnoofRestrictedCells> | | |
| >>NG-RAN CGI | M | | 9.3.1.73 | |
| >>timer | O | | | Indicates how long the redcap UEs should be restricted from those cells |

Figure 2:
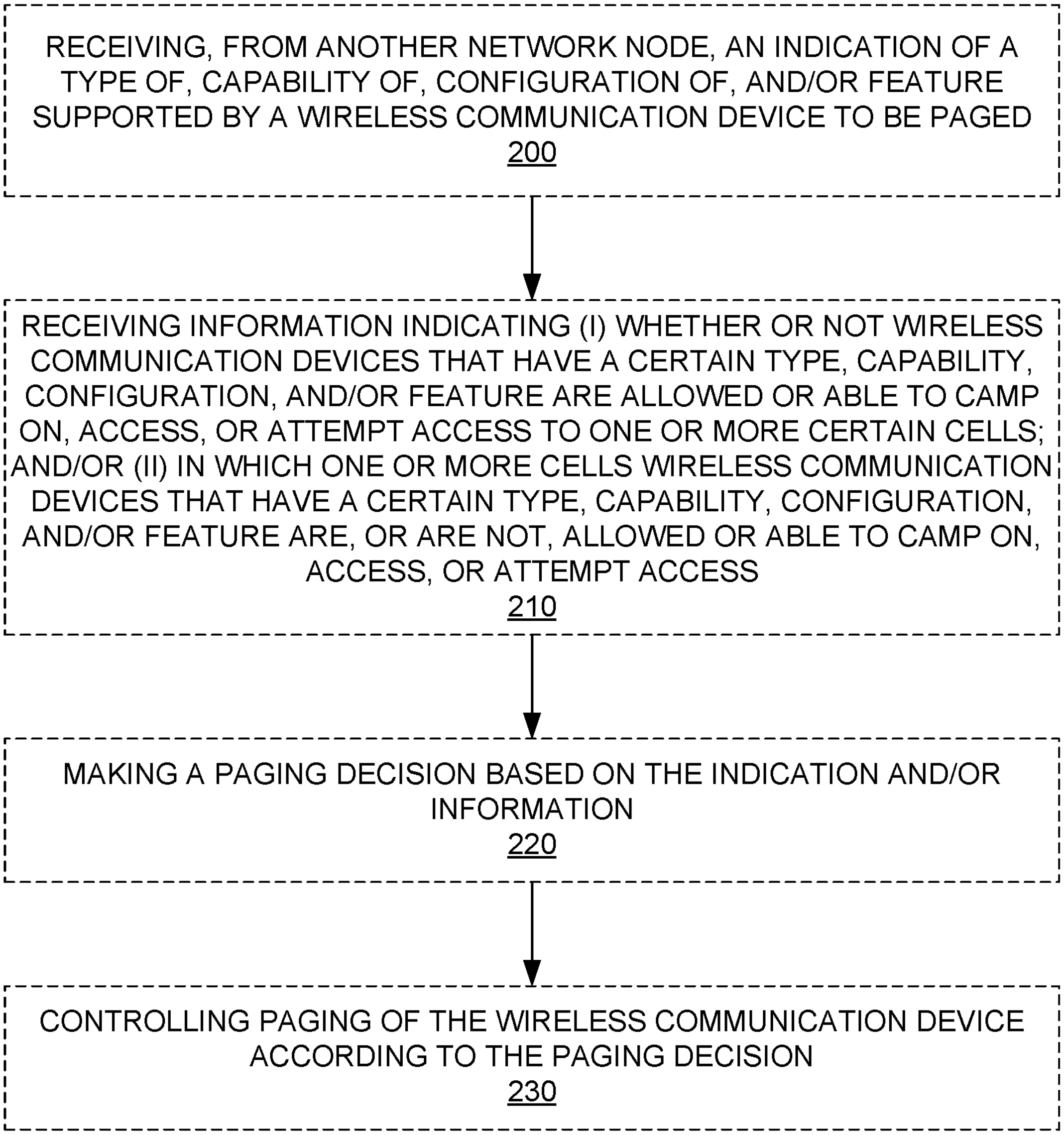
FIG. 2 is a logic flow diagram of a method performed by a network node according to some embodiments.

In view of the modifications and variations herein, FIG. 2 depicts a method performed by a network node 12B in accordance with particular embodiments. The method includes one or more of the steps shown. For example, the method may include receiving, from another network node 12A, an indication 14 of a type of, capability of, configuration of, and/or feature supported by a wireless communication device 16 to be paged (Block 200). Alternatively or additionally, the method may include receiving information 20 indicating (i) whether or not wireless communication devices that have a certain type, capability, configuration, and/or feature are allowed or able to camp on, access, or attempt access to one or more certain cells; and/or (ii) in which one or more cells wireless communication devices that have a certain type, capability, configuration, and/or feature are, or are not, allowed or able to camp on, access, or attempt access (Block 210).

In some embodiments, the method also comprises making a paging decision 22 based on the received indication 14 and/or information 22 (Block 220). In this case, the method may also comprise controlling paging of the wireless communication device 16 according to the paging decision 22 (Block 230).

In some embodiments, the paging decision is a decision as to at least whether the wireless communication device is, or is not, to be paged. In other embodiments, the paging decision is a decision as to at least whether the wireless communication device is, or is not, to be paged in a certain cell. In yet other embodiments, the paging decision is a decision as to at least, in which one or more cells, if any, the wireless communication device is or is not to be paged. In yet other embodiments, the paging decision is a decision as to at least whether to request another network node to page the wireless communication device.

In some embodiments, the paging decision is a decision as to in which one or more cells, if any, the wireless communication device is or is not to be paged. In some embodiments, said controlling comprises paging the wireless communication device in one or more cells in which the wireless communication device is to be paged according to said decision. In other embodiments, said controlling alternatively or additionally comprises refraining from paging the wireless communication device in one or more cells in which the wireless communication device is not to be paged according to said decision.

In some embodiments, the paging decision is a decision as to whether to request another network node to page the wireless communication device. In this case, the method further comprises requesting, or refraining from requesting, the another network node to page the wireless communication device according to the decision.

In some embodiments, the paging decision is made based also on information. The information indicates whether or not wireless communication devices that have the type, capability, configuration, and/or feature indicated by said indication are allowed or able to camp on, access, or attempt access to one or more certain cells. In other embodiments, information additionally or alternatively indicates in which one or more cells wireless communication devices that have the type, capability, configuration, and/or feature indicated by said indication are, or are not, allowed or able to camp on, access, or attempt access.

In some embodiments, receiving the indication comprises receiving a paging message that requests the network node to page the wireless communication device, wherein the indication is included in the paging message. In some embodiments, the indication comprises, or is included in, a UE Radio Capability for Paging information element.

In some embodiments, the indication indicates whether, or that, the wireless communication device to be paged is a Reduced Capability, RedCap, User Equipment, UE. In some embodiments, making the decision comprises making the decision to page the wireless communication device in a cell served by the network node if the indication indicates the wireless communication device is a RedCap UE and if RedCap UEs are allowed or able to camp on, access, or attempt access in the cell. In other embodiments, making the decision alternatively comprises making the decision to refrain from paging the wireless communication device in a cell served by the network node if the indication indicates the wireless communication device is a RedCap UE and if RedCap UEs are not allowed or able to camp on, access, or attempt access in the cell. In some embodiments, making the decision comprises making the decision to request another network node to page the wireless communication device in a cell served by the another network node if the indication indicates the wireless communication device is a RedCap UE and if RedCap UEs are allowed or able to camp on, access, or attempt access in the cell. In other embodiments, making the decision alternatively comprises making the decision to refrain from requesting another network node to page the wireless communication device in a cell served by the another network node if the indication indicates the wireless communication device is a RedCap UE and if RedCap UEs are not allowed or able to camp on, access, or attempt access in the cell.

Figure 3:
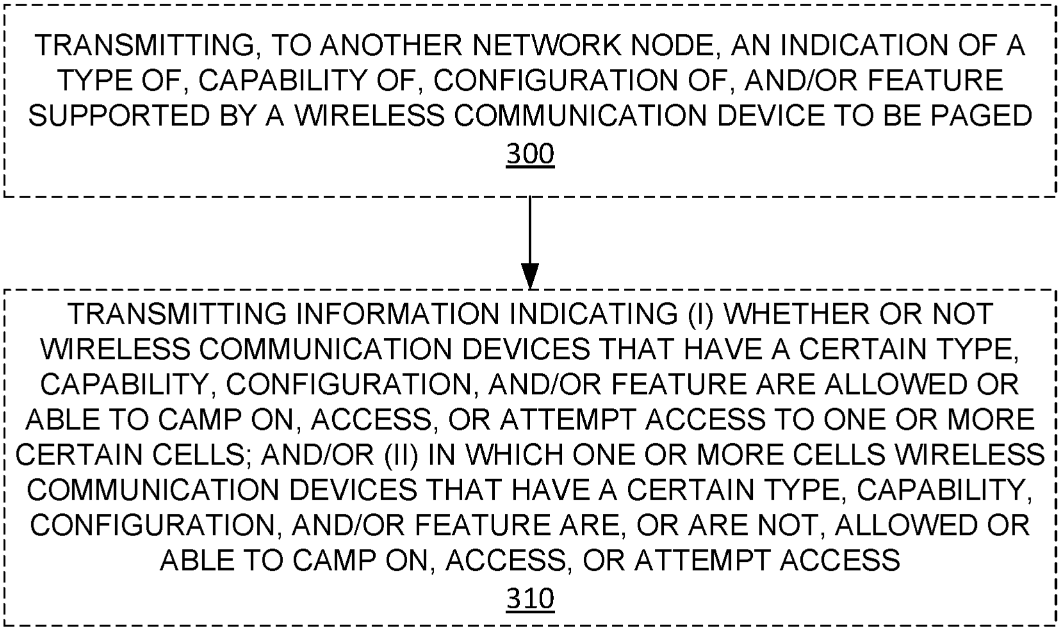
FIG. 3 is a logic flow diagram of a method performed by a network node according to other embodiments.

FIG. 3 depicts a method performed by a network node 12B in accordance with other particular embodiments. The method includes one or more of the steps shown. For example, the method may include transmitting, to another network node 12A, an indication of a type of, capability of, configuration of, and/or feature supported by a wireless communication device 16 to be paged (Block 300). Alternatively or additionally, the method may include transmitting information 20 indicating (i) whether or not wireless communication devices that have a certain type, capability, configuration, and/or feature are allowed or able to camp on, access, or attempt access to one or more certain cells; and/or (ii) in which one or more cells wireless communication devices that have a certain type, capability, configuration, and/or feature are, or are not, allowed or able to camp on, access, or attempt access (Block 310).

In some embodiments, transmitting the indication comprises transmitting a paging message that requests the another network node to page the wireless communication device. In some embodiments, the indication is included in the paging message. In some embodiments, the indication comprises, or is included in, a UE Radio Capability for Paging information element.

In some embodiments, the indication indicates whether, or that, the wireless communication device to be paged is a Reduced Capability, RedCap, User Equipment, UE.

In some embodiments, the method further comprises transmitting, to the another network node, information. The information indicates whether or not wireless communication devices that have the type, capability, configuration, and/or feature indicated by said indication are allowed or able to camp on, access, or attempt access to one or more certain cells. In other embodiments, the information alternatively or additionally indicates in which one or more cells wireless communication devices that have the type, capability, configuration, and/or feature indicated by said indication are, or are not, allowed or able to camp on, access, or attempt access. In some embodiments, the information indicates whether or not wireless communication devices that are Reduced Capability, RedCap, User Equipments, UEs, are allowed or able to camp on, access, or attempt access to one or more certain cells. In other embodiments, the information alternatively or additionally indicates in which one or more cells wireless communication devices that are RedCap UEs are, or are not, allowed or able to camp on, access, or attempt access.

Embodiments herein also include corresponding apparatuses. Embodiments herein for instance include a network node 12A, 12B configured to perform any of the steps of any of the embodiments described above for the network node 12A, 12B.

Embodiments also include a network node 12A, 12B comprising processing circuitry and power supply circuitry. The processing circuitry is configured to perform any of the steps of any of the embodiments described above for the network node 12A, 12B. The power supply circuitry is configured to supply power to the network node 12A, 12B.

Embodiments further include a network node 12A, 12B comprising processing circuitry. The processing circuitry is configured to perform any of the steps of any of the embodiments described above for the network node 12A, 12B. In some embodiments, the network node 12A, 12B further comprises communication circuitry.

Embodiments further include a network node 12A, 12B comprising processing circuitry and memory. The memory contains instructions executable by the processing circuitry whereby the network node 12A, 12B is configured to perform any of the steps of any of the embodiments described above for the network node 12A, 12B.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
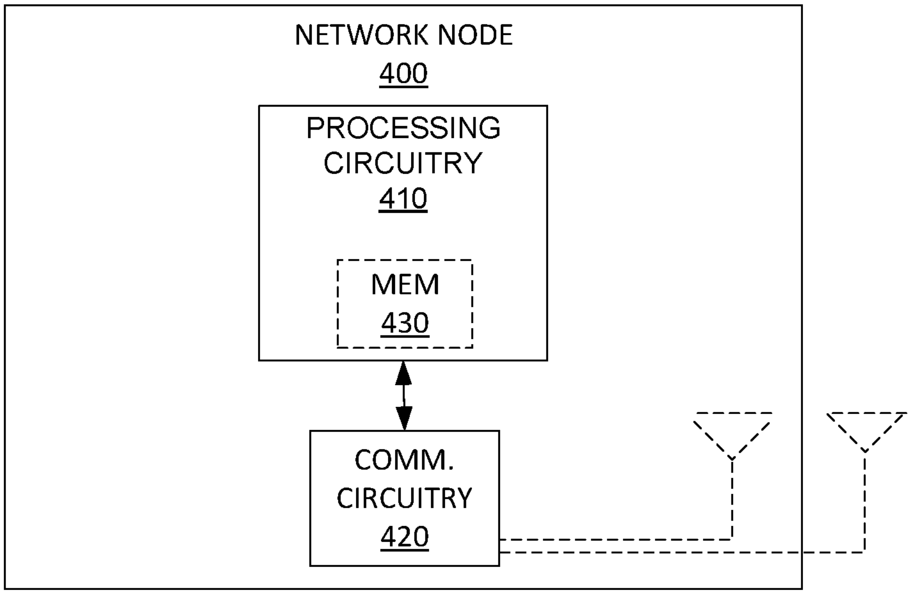
FIG. 4 is a block diagram of a network node according to other embodiments.

FIG. 4 for example illustrates a network node 400 (e.g., network node 12A or 12B) as implemented in accordance with one or more embodiments. As shown, the network node 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the network node 400. The processing circuitry 410 is configured to perform processing described above, e.g., in FIGS. 2 and/or 3, such as by executing instructions stored in memory 430. The processing circuitry 410 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 5:
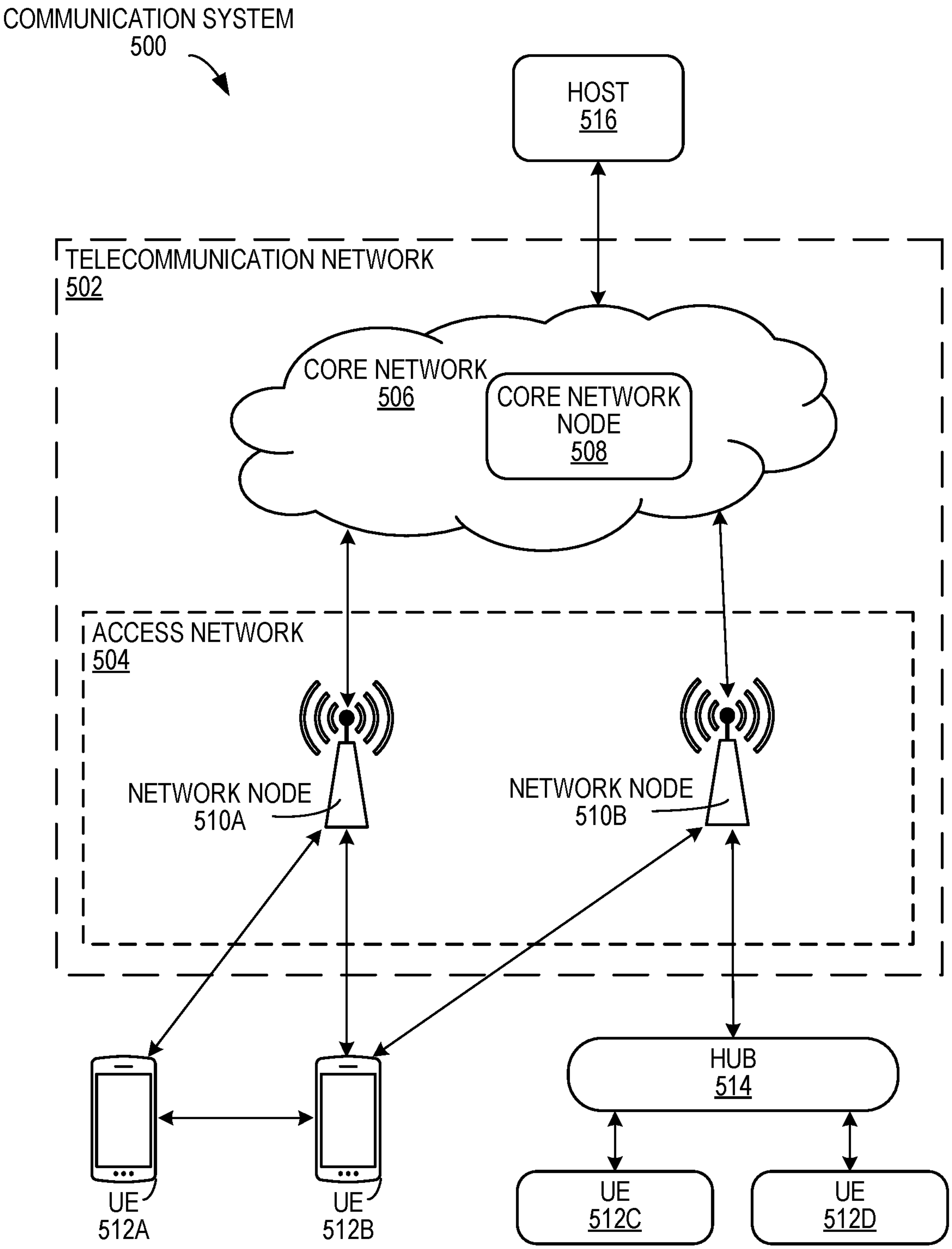
FIG. 5 is a block diagram of a communication system in accordance with some embodiments

FIG. 5 shows an example of a communication system 500 in accordance with some embodiments.

In the example, the communication system 500 includes a telecommunication network 502 that includes an access network 504, such as a radio access network (RAN), and a core network 506, which includes one or more core network nodes 508. The access network 504 includes one or more access network nodes, such as network nodes 510*a* and 510*b* (one or more of which may be generally referred to as network nodes 510), or any other similar 3rd Generation Partnership Project (3GPP) access node or non-3GPP access point. The network nodes 510 facilitate direct or indirect connection of user equipment (UE), such as by connecting UEs 512*a*, 512*b*, 512*c*, and 512*d* (one or more of which may be generally referred to as UEs 512) to the core network 506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 500 may include any number of wired or wireless networks, network nodes, UEs, and/or any other components or systems that may facilitate or participate in the communication of data and/or signals whether via wired or wireless connections. The communication system 500 may include and/or interface with any type of communication, telecommunication, data, cellular, radio network, and/or other similar type of system.

The UEs 512 may be any of a wide variety of communication devices, including wireless devices arranged, configured, and/or operable to communicate wirelessly with the network nodes 510 and other communication devices. Similarly, the network nodes 510 are arranged, capable, configured, and/or operable to communicate directly or indirectly with the UEs 512 and/or with other network nodes or equipment in the telecommunication network 502 to enable and/or provide network access, such as wireless network access, and/or to perform other functions, such as administration in the telecommunication network 502.

In the depicted example, the core network 506 connects the network nodes 510 to one or more hosts, such as host 516. These connections may be direct or indirect via one or more intermediary networks or devices. In other examples, network nodes may be directly coupled to hosts. The core network 506 includes one more core network nodes (e.g., core network node 508) that are structured with hardware and software components. Features of these components may be substantially similar to those described with respect to the UEs, network nodes, and/or hosts, such that the descriptions thereof are generally applicable to the corresponding components of the core network node 508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 516 may be under the ownership or control of a service provider other than an operator or provider of the access network 504 and/or the telecommunication network 502, and may be operated by the service provider or on behalf of the service provider. The host 516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 500 of FIG. 5 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 502 is a cellular network that implements 3GPP standardized features. Accordingly, the telecommunications network 502 may support network slicing to provide different logical networks to different devices that are connected to the telecommunication network 502. For example, the telecommunications network 502 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 512 are configured to transmit and/or receive information without direct human interaction. For instance, a UE may be designed to transmit information to the access network 504 on a predetermined schedule, when triggered by an internal or external event, or in response to requests from the access network 504. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 514 communicates with the access network 504 to facilitate indirect communication between one or more UEs (e.g., UE 512*c* and/or 512*d*) and network nodes (e.g., network node 510*b*). In some examples, the hub 514 may be a controller, router, content source and analytics, or any of the other communication devices described herein regarding UEs. For example, the hub 514 may be a broadband router enabling access to the core network 506 for the UEs. As another example, the hub 514 may be a controller that sends commands or instructions to one or more actuators in the UEs. Commands or instructions may be received from the UEs, network nodes 510, or by executable code, script, process, or other instructions in the hub 514. As another example, the hub 514 may be a data collector that acts as temporary storage for UE data and, in some embodiments, may perform analysis or other processing of the data. As another example, the hub 514 may be a content source. For example, for a UE that is a VR headset, display, loudspeaker or other media delivery device, the hub 514 may retrieve VR assets, video, audio, or other media or data related to sensory information via a network node, which the hub 514 then provides to the UE either directly, after performing local processing, and/or after adding additional local content. In still another example, the hub 514 acts as a proxy server or orchestrator for the UEs, in particular in if one or more of the UEs are low energy IoT devices.

The hub 514 may have a constant/persistent or intermittent connection to the network node 510*b*. The hub 514 may also allow for a different communication scheme and/or schedule between the hub 514 and UEs (e.g., UE 512*c* and/or 512*d*), and between the hub 514 and the core network 506. In other examples, the hub 514 is connected to the core network 506 and/or one or more UEs via a wired connection. Moreover, the hub 514 may be configured to connect to an M2M service provider over the access network 504 and/or to another UE over a direct connection. In some scenarios, UEs may establish a wireless connection with the network nodes 510 while still connected via the hub 514 via a wired or wireless connection. In some embodiments, the hub 514 may be a dedicated hub—that is, a hub whose primary function is to route communications to/from the UEs from/to the network node 510*b*. In other embodiments, the hub 514 may be a non-dedicated hub—that is, a device which is capable of operating to route communications between the UEs and network node 510*b*, but which is additionally capable of operating as a communication start and/or end point for certain data channels.

Figure 6:
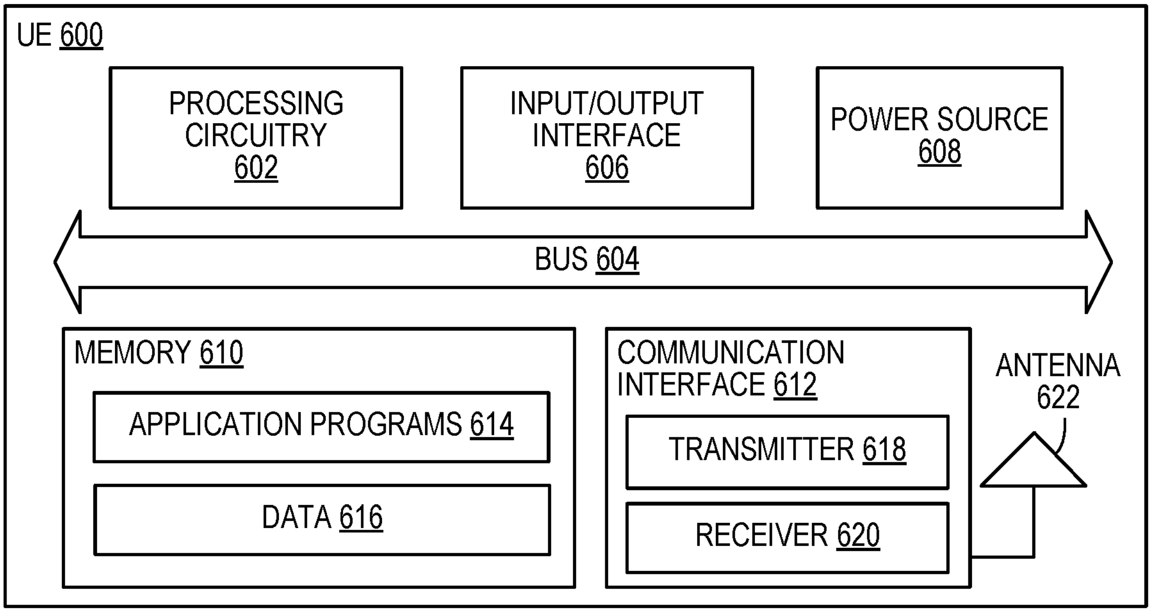
FIG. 6 is a block diagram of a user equipment according to some embodiments.

FIG. 6 shows a UE 600 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 600 includes processing circuitry 602 that is operatively coupled via a bus 604 to an input/output interface 606, a power source 608, a memory 610, a communication interface 612, and/or any other component, or any combination thereof. Certain UEs may utilize all or a subset of the components shown in FIG. 6. The level of integration between the components may vary from one UE to another UE. Further, certain UEs may contain multiple instances of a component, such as multiple processors, memories, transceivers, transmitters, receivers, etc.

The processing circuitry 602 is configured to process instructions and data and may be configured to implement any sequential state machine operative to execute instructions stored as machine-readable computer programs in the memory 610. The processing circuitry 602 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 602 may include multiple central processing units (CPUs).

In the example, the input/output interface 606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 608 is structured as a battery or battery pack. Other types of power sources, such as an external power source (e.g., an electricity outlet), photovoltaic device, or power cell, may be used. The power source 608 may further include power circuitry for delivering power from the power source 608 itself, and/or an external power source, to the various parts of the UE 600 via input circuitry or an interface such as an electrical power cable. Delivering power may be, for example, for charging of the power source 608. Power circuitry may perform any formatting, converting, or other modification to the power from the power source 608 to make the power suitable for the respective components of the UE 600 to which power is supplied.

The memory 610 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 610 includes one or more application programs 614, such as an operating system, web browser application, a widget, gadget engine, or other application, and corresponding data 616. The memory 610 may store, for use by the UE 600, any of a variety of various operating systems or combinations of operating systems.

The memory 610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 610 may allow the UE 600 to access instructions, application programs and the like, stored on transitory or non-transitory memory media, to off-load data, or to upload data. An article of manufacture, such as one utilizing a communication system may be tangibly embodied as or in the memory 610, which may be or comprise a device-readable storage medium.

The processing circuitry 602 may be configured to communicate with an access network or other network using the communication interface 612. The communication interface 612 may comprise one or more communication subsystems and may include or be communicatively coupled to an antenna 622. The communication interface 612 may include one or more transceivers used to communicate, such as by communicating with one or more remote transceivers of another device capable of wireless communication (e.g., another UE or a network node in an access network). Each transceiver may include a transmitter 618 and/or a receiver 620 appropriate to provide network communications (e.g., optical, electrical, frequency allocations, and so forth). Moreover, the transmitter 618 and receiver 620 may be coupled to one or more antennas (e.g., antenna 622) and may share circuit components, software or firmware, or alternatively be implemented separately.

In the illustrated embodiment, communication functions of the communication interface 612 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 600 shown in FIG. 6.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 7:
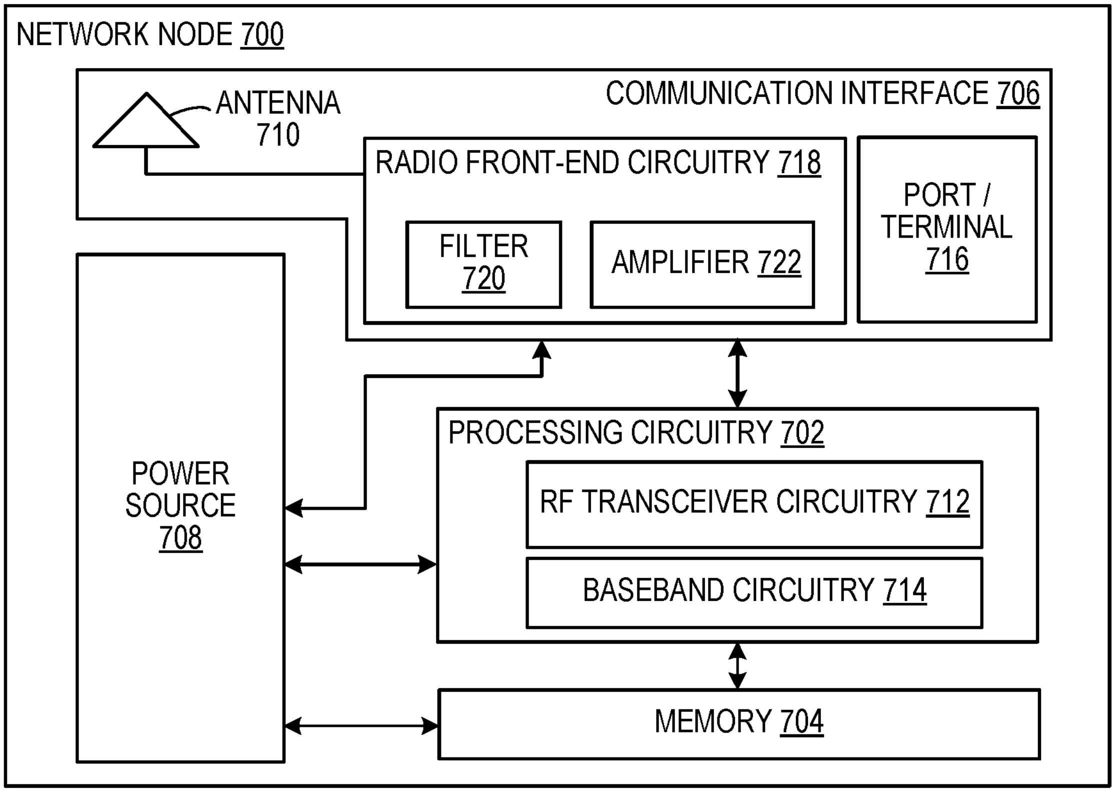
FIG. 7 is a block diagram of a network node according to some embodiments.

FIG. 7 shows a network node 700 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 700 includes a processing circuitry 702, a memory 704, a communication interface 706, and a power source 708. The network node 700 may be composed of multiple physically separate components (e.g., a NodeB component and a RNC component, or a BTS component and a BSC component, etc.), which may each have their own respective components. In certain scenarios in which the network node 700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 700 may be configured to support multiple radio access technologies (RATs). In such embodiments, some components may be duplicated (e.g., separate memory 704 for different RATs) and some components may be reused (e.g., a same antenna 710 may be shared by different RATs). The network node 700 may also include multiple sets of the various illustrated components for different wireless technologies integrated into network node 700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 700.

The processing circuitry 702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 700 components, such as the memory 704, to provide network node 700 functionality.

In some embodiments, the processing circuitry 702 includes a system on a chip (SOC). In some embodiments, the processing circuitry 702 includes one or more of radio frequency (RF) transceiver circuitry 712 and baseband processing circuitry 714. In some embodiments, the radio frequency (RF) transceiver circuitry 712 and the baseband processing circuitry 714 may be on separate chips (or sets of chips), boards, or units, such as radio units and digital units. In alternative embodiments, part or all of RF transceiver circuitry 712 and baseband processing circuitry 714 may be on the same chip or set of chips, boards, or units.

The memory 704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 702. The memory 704 may store any suitable instructions, data, or information, including a computer program, software, an application including one or more of logic, rules, code, tables, and/or other instructions capable of being executed by the processing circuitry 702 and utilized by the network node 700. The memory 704 may be used to store any calculations made by the processing circuitry 702 and/or any data received via the communication interface 706. In some embodiments, the processing circuitry 702 and memory 704 is integrated.

The communication interface 706 is used in wired or wireless communication of signaling and/or data between a network node, access network, and/or UE. As illustrated, the communication interface 706 comprises port(s)/terminal(s) 716 to send and receive data, for example to and from a network over a wired connection. The communication interface 706 also includes radio front-end circuitry 718 that may be coupled to, or in certain embodiments a part of, the antenna 710. Radio front-end circuitry 718 comprises filters 720 and amplifiers 722. The radio front-end circuitry 718 may be connected to an antenna 710 and processing circuitry 702. The radio front-end circuitry may be configured to condition signals communicated between antenna 710 and processing circuitry 702. The radio front-end circuitry 718 may receive digital data that is to be sent out to other network nodes or UEs via a wireless connection. The radio front-end circuitry 718 may convert the digital data into a radio signal having the appropriate channel and bandwidth parameters using a combination of filters 720 and/or amplifiers 722. The radio signal may then be transmitted via the antenna 710. Similarly, when receiving data, the antenna 710 may collect radio signals which are then converted into digital data by the radio front-end circuitry 718. The digital data may be passed to the processing circuitry 702. In other embodiments, the communication interface may comprise different components and/or different combinations of components.

In certain alternative embodiments, the network node 700 does not include separate radio front-end circuitry 718, instead, the processing circuitry 702 includes radio front-end circuitry and is connected to the antenna 710. Similarly, in some embodiments, all or some of the RF transceiver circuitry 712 is part of the communication interface 706. In still other embodiments, the communication interface 706 includes one or more ports or terminals 716, the radio front-end circuitry 718, and the RF transceiver circuitry 712, as part of a radio unit (not shown), and the communication interface 706 communicates with the baseband processing circuitry 714, which is part of a digital unit (not shown).

The antenna 710 may include one or more antennas, or antenna arrays, configured to send and/or receive wireless signals. The antenna 710 may be coupled to the radio front-end circuitry 718 and may be any type of antenna capable of transmitting and receiving data and/or signals wirelessly. In certain embodiments, the antenna 710 is separate from the network node 700 and connectable to the network node 700 through an interface or port.

The antenna 710, communication interface 706, and/or the processing circuitry 702 may be configured to perform any receiving operations and/or certain obtaining operations described herein as being performed by the network node. Any information, data and/or signals may be received from a UE, another network node and/or any other network equipment. Similarly, the antenna 710, the communication interface 706, and/or the processing circuitry 702 may be configured to perform any transmitting operations described herein as being performed by the network node. Any information, data and/or signals may be transmitted to a UE, another network node and/or any other network equipment.

The power source 708 provides power to the various components of network node 700 in a form suitable for the respective components (e.g., at a voltage and current level needed for each respective component). The power source 708 may further comprise, or be coupled to, power management circuitry to supply the components of the network node 700 with power for performing the functionality described herein. For example, the network node 700 may be connectable to an external power source (e.g., the power grid, an electricity outlet) via an input circuitry or interface such as an electrical cable, whereby the external power source supplies power to power circuitry of the power source 708. As a further example, the power source 708 may comprise a source of power in the form of a battery or battery pack which is connected to, or integrated in, power circuitry. The battery may provide backup power should the external power source fail.

Embodiments of the network node 700 may include additional components beyond those shown in FIG. 7 for providing certain aspects of the network node's functionality, including any of the functionality described herein and/or any functionality necessary to support the subject matter described herein. For example, the network node 700 may include user interface equipment to allow input of information into the network node 700 and to allow output of information from the network node 700. This may allow a user to perform diagnostic, maintenance, repair, and other administrative functions for the network node 700.

Figure 8:
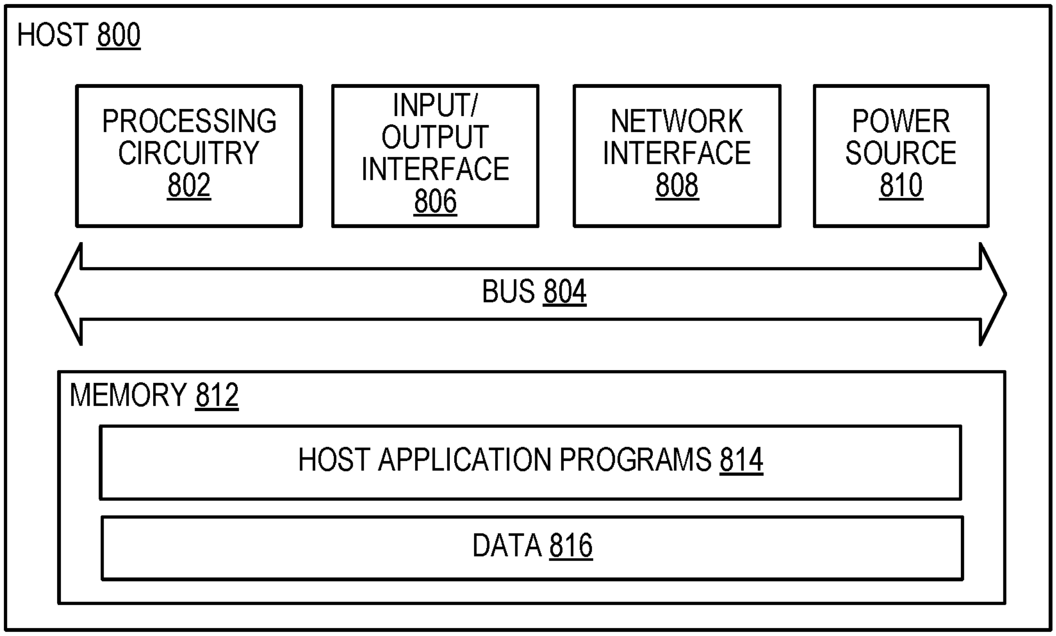
FIG. 8 is a block diagram of a host according to some embodiments.

FIG. 8 is a block diagram of a host 800, which may be an embodiment of the host 516 of FIG. 5, in accordance with various aspects described herein. As used herein, the host 800 may be or comprise various combinations hardware and/or software, including a standalone server, a blade server, a cloud-implemented server, a distributed server, a virtual machine, container, or processing resources in a server farm. The host 800 may provide one or more services to one or more UEs.

The host 800 includes processing circuitry 802 that is operatively coupled via a bus 804 to an input/output interface 806, a network interface 808, a power source 810, and a memory 812. Other components may be included in other embodiments. Features of these components may be substantially similar to those described with respect to the devices of previous figures, such as FIGS. 6 and 7, such that the descriptions thereof are generally applicable to the corresponding components of host 800.

The memory 812 may include one or more computer programs including one or more host application programs 814 and data 816, which may include user data, e.g., data generated by a UE for the host 800 or data generated by the host 800 for a UE. Embodiments of the host 800 may utilize only a subset or all of the components shown. The host application programs 814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 814 may also provide for user authentication and licensing checks and may periodically report health, routes, and content availability to a central node, such as a device in or on the edge of a core network. Accordingly, the host 800 may select and/or indicate a different host for over-the-top services for a UE. The host application programs 814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 9:
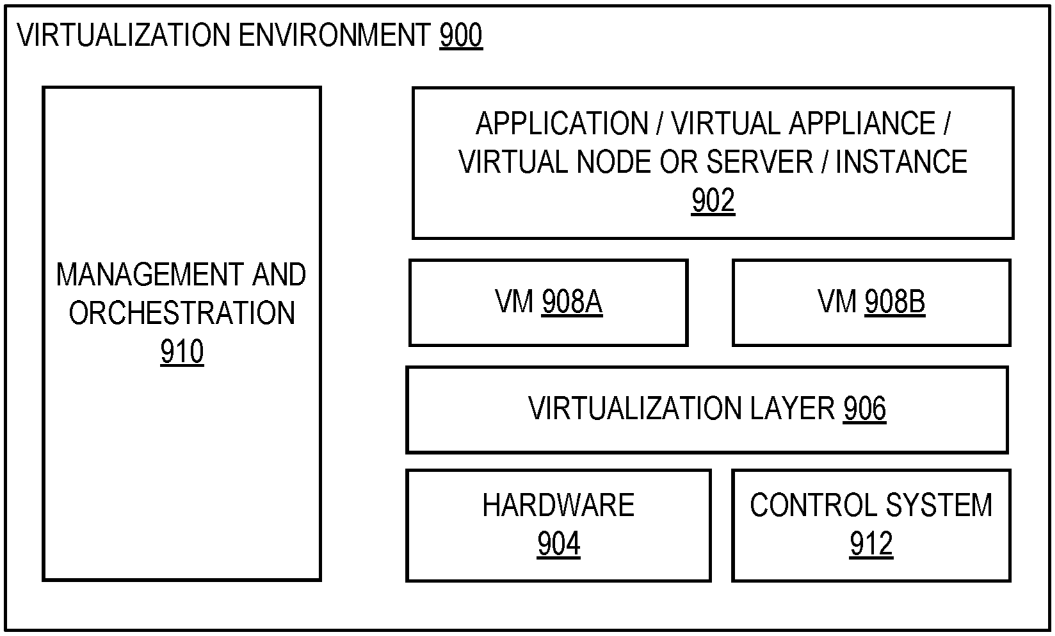
FIG. 9 is a block diagram of a virtualization environment according to some embodiments.

FIG. 9 is a block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 904 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 906 (also referred to as hypervisors or virtual machine monitors (VMMs)), provide VMs 908*a* and 908*b* (one or more of which may be generally referred to as VMs 908), and/or perform any of the functions, features and/or benefits described in relation with some embodiments described herein. The virtualization layer 906 may present a virtual operating platform that appears like networking hardware to the VMs 908.

The VMs 908 comprise virtual processing, virtual memory, virtual networking or interface and virtual storage, and may be run by a corresponding virtualization layer 906. Different embodiments of the instance of a virtual appliance 902 may be implemented on one or more of VMs 908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 908 may be a software implementation of a physical machine that runs programs as if they were executing on a physical, non-virtualized machine. Each of the VMs 908, and that part of hardware 904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 908 on top of the hardware 904 and corresponds to the application 902.

Hardware 904 may be implemented in a standalone network node with generic or specific components. Hardware 904 may implement some functions via virtualization. Alternatively, hardware 904 may be part of a larger cluster of hardware (e.g. such as in a data center or CPE) where many hardware nodes work together and are managed via management and orchestration 910, which, among others, oversees lifecycle management of applications 902. In some embodiments, hardware 904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 912 which may alternatively be used for communication between hardware nodes and radio units.

Figure 10:
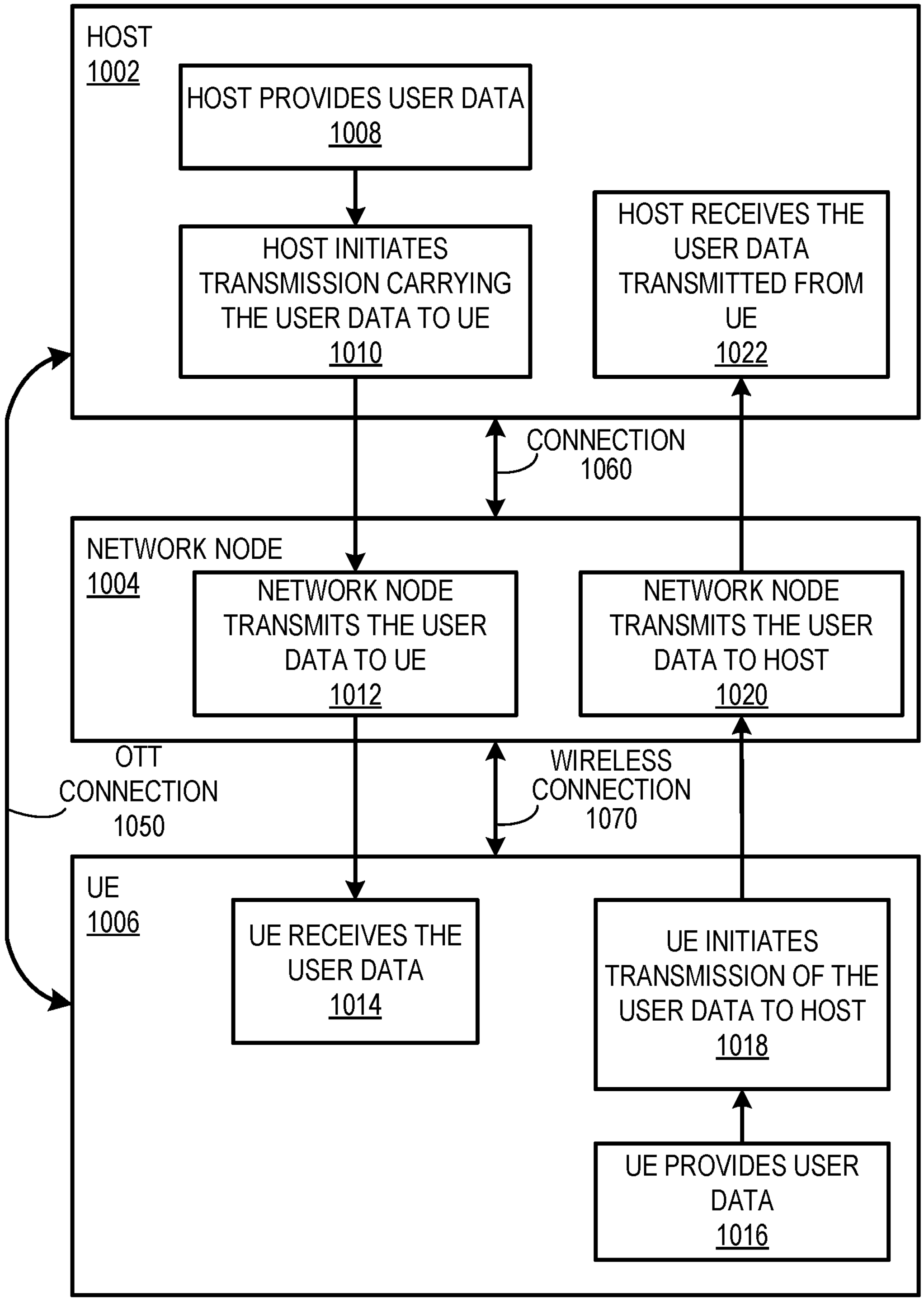
FIG. 10 is a block diagram of a host communicating via a network node with a UE over a partially wireless connection in accordance with some embodiments.

FIG. 10 shows a communication diagram of a host 1002 communicating via a network node 1004 with a UE 1006 over a partially wireless connection in accordance with some embodiments. Example implementations, in accordance with various embodiments, of the UE (such as a UE 512*a* of FIG. 5 and/or UE 600 of FIG. 6), network node (such as network node 510*a* of FIG. 5 and/or network node 700 of FIG. 7), and host (such as host 516 of FIG. 5 and/or host 800 of FIG. 8) discussed in the preceding paragraphs will now be described with reference to FIG. 10.

Like host 800, embodiments of host 1002 include hardware, such as a communication interface, processing circuitry, and memory. The host 1002 also includes software, which is stored in or accessible by the host 1002 and executable by the processing circuitry. The software includes a host application that may be operable to provide a service to a remote user, such as the UE 1006 connecting via an over-the-top (OTT) connection 1050 extending between the UE 1006 and host 1002. In providing the service to the remote user, a host application may provide user data which is transmitted using the OTT connection 1050.

The network node 1004 includes hardware enabling it to communicate with the host 1002 and UE 1006. The connection 1060 may be direct or pass through a core network (like core network 506 of FIG. 5) and/or one or more other intermediate networks, such as one or more public, private, or hosted networks. For example, an intermediate network may be a backbone network or the Internet.

The UE 1006 includes hardware and software, which is stored in or accessible by UE 1006 and executable by the UE's processing circuitry. The software includes a client application, such as a web browser or operator-specific "app" that may be operable to provide a service to a human or non-human user via UE 1006 with the support of the host 1002. In the host 1002, an executing host application may communicate with the executing client application via the OTT connection 1050 terminating at the UE 1006 and host 1002. In providing the service to the user, the UE's client application may receive request data from the host's host application and provide user data in response to the request data. The OTT connection 1050 may transfer both the request data and the user data. The UE's client application may interact with the user to generate the user data that it provides to the host application through the OTT connection 1050.

The OTT connection 1050 may extend via a connection 1060 between the host 1002 and the network node 1004 and via a wireless connection 1070 between the network node 1004 and the UE 1006 to provide the connection between the host 1002 and the UE 1006. The connection 1060 and wireless connection 1070, over which the OTT connection 1050 may be provided, have been drawn abstractly to illustrate the communication between the host 1002 and the UE 1006 via the network node 1004, without explicit reference to any intermediary devices and the precise routing of messages via these devices.

As an example of transmitting data via the OTT connection 1050, in step 1008, the host 1002 provides user data, which may be performed by executing a host application. In some embodiments, the user data is associated with a particular human user interacting with the UE 1006. In other embodiments, the user data is associated with a UE 1006 that shares data with the host 1002 without explicit human interaction. In step 1010, the host 1002 initiates a transmission carrying the user data towards the UE 1006. The host 1002 may initiate the transmission responsive to a request transmitted by the UE 1006. The request may be caused by human interaction with the UE 1006 or by operation of the client application executing on the UE 1006. The transmission may pass via the network node 1004, in accordance with the teachings of the embodiments described throughout this disclosure. Accordingly, in step 1012, the network node 1004 transmits to the UE 1006 the user data that was carried in the transmission that the host 1002 initiated, in accordance with the teachings of the embodiments described throughout this disclosure. In step 1014, the UE 1006 receives the user data carried in the transmission, which may be performed by a client application executed on the UE 1006 associated with the host application executed by the host 1002.

In some examples, the UE 1006 executes a client application which provides user data to the host 1002. The user data may be provided in reaction or response to the data received from the host 1002. Accordingly, in step 1016, the UE 1006 may provide user data, which may be performed by executing the client application. In providing the user data, the client application may further consider user input received from the user via an input/output interface of the UE 1006. Regardless of the specific manner in which the user data was provided, the UE 1006 initiates, in step 1018, transmission of the user data towards the host 1002 via the network node 1004. In step 1020, in accordance with the teachings of the embodiments described throughout this disclosure, the network node 1004 receives user data from the UE 1006 and initiates transmission of the received user data towards the host 1002. In step 1022, the host 1002 receives the user data carried in the transmission initiated by the UE 1006.

One or more of the various embodiments improve the performance of OTT services provided to the UE 1006 using the OTT connection 1050, in which the wireless connection 1070 forms the last segment.

In an example scenario, factory status information may be collected and analyzed by the host 1002. As another example, the host 1002 may process audio and video data which may have been retrieved from a UE for use in creating maps. As another example, the host 1002 may collect and analyze real-time data to assist in controlling vehicle congestion (e.g., controlling traffic lights). As another example, the host 1002 may store surveillance video uploaded by a UE. As another example, the host 1002 may store or control access to media content such as video, audio, VR or AR which it can broadcast, multicast or unicast to UEs. As other examples, the host 1002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1050 between the host 1002 and UE 1006, in response to variations in the measurement results. The measurement procedure and/or the network functionality for reconfiguring the OTT connection may be implemented in software and hardware of the host 1002 and/or UE 1006. In some embodiments, sensors (not shown) may be deployed in or in association with other devices through which the OTT connection 1050 passes; the sensors may participate in the measurement procedure by supplying values of the monitored quantities exemplified above, or supplying values of other physical quantities from which software may compute or estimate the monitored quantities. The reconfiguring of the OTT connection 1050 may include message format, retransmission settings, preferred routing etc.; the reconfiguring need not directly alter the operation of the network node 1004. Such procedures and functionalities may be known and practiced in the art. In certain embodiments, measurements may involve proprietary UE signaling that facilitates measurements of throughput, propagation times, latency and the like, by the host 1002. The measurements may be implemented in that software causes messages to be transmitted, in particular empty or 'dummy' messages, using the OTT connection 1050 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

Group A Embodiments

A1. A method performed by a network node, the method comprising:

receiving, from another network node, an indication of a type of, capability of, configuration of, and/or feature supported by a wireless communication device to be paged.

A2. The method of embodiment A1, further comprising making a paging decision based on the received indication.

A3. The method of embodiment A2, wherein the paging decision is a decision as to at least one of any one or more of:

whether the wireless communication device is, or is not, to be paged;

whether the wireless communication device is, or is not, to be paged in a certain cell;

in which one or more cells, if any, the wireless communication device is or is not to be paged; and whether to request another network node to page the wireless communication device.

A4. The method of embodiment A2, wherein the paging decision is a decision as to whether the wireless communication device is, or is not, to be paged, and wherein the method further comprises:

paging, or not paging, the wireless communication device according to the decision; or requesting, or not requesting, another network node to page the wireless communication device depending respectively on whether the wireless communication device is, or is not, to be paged according to the decision.

A5. The method of any of embodiments A3-A4, wherein the paging decision is a decision as to whether the wireless communication device is, or is not, to be paged in a certain cell, and wherein the method further comprises:

paging, or not paging, the wireless communication device in the certain cell according to the decision; or requesting, or not requesting, another network node to page the wireless communication device in the certain cell depending respectively on whether the wireless communication device is, or is not, to be paged in the certain cell according to the decision.

A6. The method of any of embodiments A4-A5, wherein the paging decision is a decision as to in which one or more cells, if any, the wireless communication device is or is not to be paged, and wherein the method further comprises:

paging the wireless communication device in one or more cell in which the wireless communication device is to be paged according to said decision; and/or refraining from paging the wireless communication device in one or more cells in which the wireless communication device is not to be paged according to said decision.

A7. The method of any of embodiments A4-A6, wherein the paging decision is a decision as to whether to request another network node to page the wireless communication device, and wherein the method further comprises requesting, or refraining from requesting, the another network node to page the wireless communication device according to the decision.

A8. The method of embodiment A7, wherein making the decision as to whether to request another network node to page the wireless communication device comprises:

deciding to request the another network node to page the wireless communication device if the wireless communication device is to be paged in at least one cell served by the another network node; and deciding not to request the another network node to page the wireless communication device if the wireless communication device is not to be paged in any of one or more cells served by the another network node.

A9. The method of any of embodiments A3-A8, wherein the paging decision is made based also on information indicating:

whether or not wireless communication devices that have the type, capability, configuration, and/or feature indicated by said indication are allowed or able to camp on, access, or attempt access to one or more certain cells; and/or in which one or more cells wireless communication devices that have the type, capability, configuration, and/or feature indicated by said indication are, or are not, allowed or able to camp on, access, or attempt access.

A10. The method of embodiment A9, further comprising:

making a decision as to whether the wireless communication device is, or is not, to be paged in a certain cell, by:

deciding that the wireless communication device is to be paged in the certain cell if the information indicates that wireless communication devices that have the type, capability, configuration, and/or feature indicated by said indication are allowed or able to camp on, access, or attempt access to the certain cell; and deciding that the wireless communication device is not to be paged in the certain cell if the information indicates that wireless communication devices that have the type, capability, configuration, and/or feature indicated by said indication are not allowed or able to camp on, access, or attempt access to the certain cell; and paging or not paging the wireless communication device in the certain cell according to the decision.

A11. The method of embodiment A9, further comprising, for each of one or more cells served by the network node:

making a decision as to whether the wireless communication device is, or is not, to be paged in the cell, by:

deciding that the wireless communication device is to be paged in the cell if the information indicates that wireless communication devices that have the type, capability, configuration, and/or feature indicated by said indication are allowed or able to camp on, access, or attempt access to the cell; and deciding that the wireless communication device is not to be paged in the cell if the information indicates that wireless communication devices that have the type, capability, configuration, and/or feature indicated by said indication are not allowed or able to camp on, access, or attempt access to the cell; and paging or not paging the wireless communication device in the cell according to the decision.

A12. The method of any of embodiments A9-A11, wherein the information is received from another network node.

A13. The method of any of embodiments A1-A12, wherein the network node is a radio network node.

A14. The method of embodiment A13, wherein the indication is received from a core network node.

A15. The method of embodiment A13, wherein the indication is received from another network node.

A16. The method of any of embodiments A1-A12, wherein the network node is a core network node.

A17. The method of embodiment A16, wherein the indication is received from another core network node.

A18. The method of embodiment A16, wherein the indication is received from a radio network node.

A19. The method of any of embodiments A1-A18, wherein receiving the indication comprises receiving a paging message that requests the network node to page the wireless communication device, wherein the indication is included in the paging message.

A20. The method of embodiment A19, wherein the indication comprises, or is included in, a UE Radio Capability for Paging information element.

A21. The method of any of embodiments A1-A20, wherein the indication indicates whether, or that, the wireless communication device to be paged is a Reduced Capability, RedCap, User Equipment, UE.

A22. The method of embodiment A3, further comprising:

paging the wireless communication device in a cell served by the network node if the indication indicates the wireless communication device is a RedCap UE and if RedCap UEs are allowed or able to camp on, access, or attempt access in the cell; and refraining from paging the wireless communication device in a cell served by the network node if the indication indicates the wireless communication device is a RedCap UE and if RedCap UEs are not allowed or able to camp on, access, or attempt access in the cell.

A23. The method of embodiment A3, further comprising:

requesting another network node to page the wireless communication device in a cell served by the another network node if the indication indicates the wireless communication device is a RedCap UE and if RedCap UEs are allowed or able to camp on, access, or attempt access in the cell; and refraining from requesting another network node to page the wireless communication device in a cell served by the another network node if the indication indicates the wireless communication device is a RedCap UE and if RedCap UEs are not allowed or able to camp on, access, or attempt access in the cell.

A24. The method of any of embodiments A9-A12, wherein the information indicates:

whether or not wireless communication devices that have the type, capability, configuration, and/or feature indicated by said indication are barred from camping on, accessing, or attempting access to one or more certain cells; and/or in which one or more cells wireless communication devices that have the type, capability, configuration, and/or feature indicated by said indication are barred from camping on, accessing, or attempting access.

A25. The method of embodiment A2, further comprising controlling paging of the wireless communication device according to the paging decision.

AA1. A method performed by a network node, the method comprising:

receiving, from another network node, information indicating:

whether or not wireless communication devices that have a certain type, capability, configuration, and/or feature are allowed or able to camp on, access, or attempt access to one or more certain cells; and/or in which one or more cells wireless communication devices that have a certain type, capability, configuration, and/or feature are, or are not, allowed or able to camp on, access, or attempt access.

AA2. The method of embodiment AA1, further comprising receiving, from another network node, an indication of a type of, capability of, configuration of, and/or feature supported by a wireless communication device to be paged.

AA3. The method of embodiment AA2, further comprising making a paging decision based on the received information.

AA4. The method of embodiment AA3, further comprising:

making a decision as to whether the wireless communication device is, or is not, to be paged in a certain cell, by:

deciding that the wireless communication device is to be paged in the certain cell if the information indicates that wireless communication devices that have the type, capability, configuration, and/or feature indicated by said indication are allowed or able to camp on, access, or attempt access to the certain cell; and deciding that the wireless communication device is not to be paged in the certain cell if the information indicates that wireless communication devices that have the type, capability, configuration, and/or feature indicated by said indication are not allowed or able to camp on, access, or attempt access to the certain cell; and paging or not paging the wireless communication device in the certain cell according to the decision.

AA5. The method of embodiment AA3, further comprising, for each of one or more cells served by the network node:

making a decision as to whether the wireless communication device is, or is not, to be paged in the cell, by:

deciding that the wireless communication device is to be paged in the cell if the information indicates that wireless communication devices that have the type, capability, configuration, and/or feature indicated by said indication are allowed or able to camp on, access, or attempt access to the cell; and deciding that the wireless communication device is not to be paged in the cell if the information indicates that wireless communication devices that have the type, capability, configuration, and/or feature indicated by said indication are not allowed or able to camp on, access, or attempt access to the cell; and paging or not paging the wireless communication device in the cell according to the decision.

AA6. The method of any of embodiments AA1-AA5, wherein the network node is a radio network node.

AA7. The method of embodiment AA6, wherein the information is received from a core network node.

AA8. The method of embodiment AA6, wherein the information is received from another network node.

AA9. The method of any of embodiments AA1-AA5, wherein the network node is a core network node.

AA10. The method of embodiment AA9, wherein the information is received from another core network node.

AA11. The method of embodiment AA9, wherein the information is received from a radio network node.

AA12. The method of embodiment AA3, wherein receiving the information comprises receiving a paging message that requests the network node to page the wireless communication device, wherein the indication is included in the paging message.

AA13. The method of embodiment AA12, wherein the indication comprises, or is included in, a UE Radio Capability for Paging information element.

AA14. The method of any of embodiments AA1-AA13, wherein the information indicates:

whether or not wireless communication devices that are Reduced Capability, RedCap, User Equipments, UEs, are allowed or able to camp on, access, or attempt access to one or more certain cells; and/or in which one or more cells wireless communication devices that are RedCap UEs are, or are not, allowed or able to camp on, access, or attempt access.

AA15. The method of embodiment AA14, further comprising:

paging a wireless communication device in a cell served by the network node if the wireless communication device is a RedCap UE and if RedCap UEs are allowed or able to camp on, access, or attempt access in the cell; and refraining from paging a wireless communication device in a cell served by the network node if the wireless communication device is a RedCap UE and if RedCap UEs are not allowed or able to camp on, access, or attempt access in the cell.

AA16. The method of embodiment AA14, further comprising:

requesting another network node to page a wireless communication device in a cell served by the another network node if the wireless communication device is a RedCap UE and if RedCap UEs are allowed or able to camp on, access, or attempt access in the cell; and refraining from requesting another network node to page a wireless communication device in a cell served by the another network node if the wireless communication device is a RedCap UE and if RedCap UEs are not allowed or able to camp on, access, or attempt access in the cell.

AA17. The method of any of embodiments AA1-AA16, wherein the information indicates:

whether or not wireless communication devices that have the type, capability, configuration, and/or feature indicated by said indication are barred from camping on, accessing, or attempting access to one or more certain cells; and/or in which one or more cells wireless communication devices that have the type, capability, configuration, and/or feature indicated by said indication are barred from camping on, accessing, or attempting access.

AA18. The method of embodiment AA2, further comprising controlling paging of the wireless communication device according to the paging decision.

Group B Embodiments

B1. A method performed by a network node, the method comprising:

transmitting, to another network node, an indication of a type of, capability of, configuration of, and/or feature supported by a wireless communication device to be paged.

B2. The method of embodiment B1, further comprising transmitting information indicating:

whether or not wireless communication devices that have the type, capability, configuration, and/or feature indicated by said indication are allowed or able to camp on, access, or attempt access to one or more certain cells; and/or in which one or more cells wireless communication devices that have the type, capability, configuration, and/or feature indicated by said indication are, or are not, allowed or able to camp on, access, or attempt access.

B3. The method of any of embodiments B1-B2, wherein the network node is a radio network node.

B4. The method of embodiment B3, wherein the indication is transmitted to another network node.

B5. The method of any of embodiments B1-B2, wherein the network node is a core network node.

B6. The method of any of embodiments B1-B5, wherein transmitting the indication comprises transmitting a paging message that requests the network node to page the wireless communication device, wherein the indication is included in the paging message.

B7. The method of embodiment B6, wherein the indication comprises, or is included in, a UE Radio Capability for Paging information element.

B8. The method of any of embodiments B1-B7, wherein the indication indicates whether, or that, the wireless communication device to be paged is a Reduced Capability, RedCap, User Equipment, UE.

B9. The method of embodiment B2, wherein the information indicates:

whether or not wireless communication devices that have the type, capability, configuration, and/or feature indicated by said indication are barred from camping on, accessing, or attempting access to one or more certain cells; and/or in which one or more cells wireless communication devices that have the type, capability, configuration, and/or feature indicated by said indication are barred from camping on, accessing, or attempting access.

BB1. A method performed by a network node, the method comprising:

transmitting, to another network node, information indicating:

whether or not wireless communication devices that have a certain type, capability, configuration, and/or feature are allowed or able to camp on, access, or attempt access to one or more certain cells; and/or in which one or more cells wireless communication devices that have a certain type, capability, configuration, and/or feature are, or are not, allowed or able to camp on, access, or attempt access.

BB2. The method of embodiment BB1, further comprising transmitting, to another network node, an indication of a type of, capability of, configuration of, and/or feature supported by a wireless communication device to be paged.

BB3. The method of any of embodiments BB1-BB2, wherein the network node is a radio network node.

BB4. The method of embodiment BB3, wherein the information is transmitted to a core network node.

BB5. The method of embodiment BB3, wherein the information is transmitted to another network node.

BB6. The method of any of embodiments BB1-BB2, wherein the network node is a core network node.

BB7. The method of embodiment BB2, wherein transmitting the information comprises transmitting a paging message that requests the network node to page the wireless communication device, wherein the indication is included in the paging message.

BB8. The method of embodiment BB7, wherein the indication comprises, or is included in, a UE Radio Capability for Paging information element.

BB9. The method of any of embodiments BB1-BB8, wherein the information indicates:

whether or not wireless communication devices that are Reduced Capability, RedCap, User Equipments, UEs, are allowed or able to camp on, access, or attempt access to one or more certain cells; and/or in which one or more cells wireless communication devices that are RedCap UEs are, or are not, allowed or able to camp on, access, or attempt access.

BB10. The method of any of embodiments BB1-BB9, wherein the information indicates:

whether or not wireless communication devices that have the type, capability, configuration, and/or feature indicated by said indication are barred from camping on, accessing, or attempting access to one or more certain cells; and/or in which one or more cells wireless communication devices that have the type, capability, configuration, and/or feature indicated by said indication are barred from camping on, accessing, or attempting access.

Group C Embodiments

C1-C8. Reserved.

C9. A network node configured to perform any of the steps of any of the Group A or Group B embodiments.

C10. A network node comprising processing circuitry configured to perform any of the steps of any of the Group A or Group B embodiments.

C11. A network node comprising:

communication circuitry; and processing circuitry configured to perform any of the steps of any of the Group A or Group B embodiments.

C12. A network node comprising:

processing circuitry configured to perform any of the steps of any of the Group A or Group B embodiments;

power supply circuitry configured to supply power to the network node.

C13. A network node comprising:

processing circuitry and memory, the memory containing instructions executable by the processing circuitry whereby the network node is configured to perform any of the steps of any of the Group A or Group B embodiments.

C14. The radio network node of any of embodiments C9-C13, wherein the network node is a base station.

C15. A computer program comprising instructions which, when executed by at least one processor of a network node, causes the network node to carry out the steps of any of the Group A or Group B embodiments.

C16. The computer program of embodiment C14, wherein the network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group A or Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group A or Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9-D22. Reserved.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A or Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

REFERENCES

1. TS 38.413, v16.5.0

Abbreviations

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| UE | User Equipment (Wireless device in 3GPP systems) |
| NR | New Radio |
| LTE | Long Term Evolution |
| gNB | Base station in NR |
| eNB | Base station in LTE |
| RRC | Radio Resource Control |
| PDCP | Packet Data Convergence Protocol |
| RLC | Radio Link Control |
| MAC | Medium Access Control |
| RAN | Radio Access Network |
| 3GPP | 3rd Generation Partnership Project |
| 5G | Fifth generation wireless systems |
| 5GS | 5G system |
| 5GC | 5G Core network |
| MBB | Mobile Broadband |
| URLLC | Ultra Reliable Low Latency Communication |
| MTC | Machine type communication |
| RedCap | Reduced Capability |
| FR1 | Frequency Range 1 |
| FR2 | Frequency Range 2 |
| Rx | Receiver |
| QAM | Quadrature amplitude modulation |
| HD | Half-Duplex |
| FDD | Frequency Diversity Duplex |
| AMF | Access and Mobility management Function |
| MME | Mobility Management Entity |
| CU | Centralized Unit |
| DU | Distributed Unit |
| gNB | Base station in NR systems |
| eNB | Base station in LTE systems |
| IE | Information Element |
| 1x RTT | CDMA2000 1x Radio Transmission Technology |
| 3GPP | 3rd Generation Partnership Project |
| 5G | 5th Generation |
| 6G | 6th Generation |
| ABS | Almost Blank Subframe |
| ARQ | Automatic Repeat Request |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CP | Cyclic Prefix |
| CPICH | Common Pilot Channel |
| CPICH | Ec/No CPICH Received energy per chip divided by the power density in the band |
| CQI | Channel Quality information |
| C-RNTI | Cell RNTI |

-continued

| | |
|---|---|
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| eMBMS | evolved Multimedia Broadcast Multicast Services |
| E-SMLC | Evolved-Serving Mobile Location Centre |
| ECGI | Evolved CGI |
| eNB | E-UTRAN NodeB |
| ePDCCH | Enhanced Physical Downlink Control Channel |
| E-SMLC | Evolved Serving Mobile Location Center |
| E-UTRA | Evolved UTRA |
| E-UTRAN | Evolved UTRAN |
| FDD | Frequency Division Duplex |
| FFS | For Further Study |
| gNB | Base station in NR |
| GNSS | Global Navigation Satellite System |
| HARQ | Hybrid Automatic Repeat Request |
| HO | Handover |
| HSPA | High Speed Packet Access |
| HRPD | High Rate Packet Data |
| LOS | Line of Sight |
| LPP | LTE Positioning Protocol |
| LTE | Long-Term Evolution |
| MAC | Medium Access Control |
| MAC | Message Authentication Code |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDCP | Packet Data Convergence Protocol |
| PDP | Power Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |
| PUSCH | Physical Uplink Shared Channel |
| RACH | Random Access Channel |
| QAM | Quadrature Amplitude Modulation |
| RAN | Radio Access Network |
| RAT | Radio Access Technology |
| RLC | Radio Link Control |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |

-continued

| | |
|---|---|
| RSSI | Received Signal Strength Indicator |
| RSTD | Reference Signal Time Difference |
| SCH | Synchronization Channel |
| SCell | Secondary Cell |
| SDAP | Service Data Adaptation Protocol |
| SDU | Service Data Unit |
| SFN | System Frame Number |
| SGW | Serving Gateway |
| SI | System Information |
| SIB | System Information Block |
| SNR | Signal to Noise Ratio |
| SON | Self Optimized Network |
| SS | Synchronization Signal |
| SSS | Secondary Synchronization Signal |
| TDD | Time Division Duplex |
| TDOA | Time Difference of Arrival |
| TOA | Time of Arrival |
| TSS | Tertiary Synchronization Signal |
| TTI | Transmission Time Interval |
| UE | User Equipment |
| UL | Uplink |
| USIM | Universal Subscriber Identity Module |
| UTDOA | Uplink Time Difference of Arrival |
| WCDMA | Wide CDMA |
| WLAN | Wide Local Area Network |

What is claimed is:

1. A method performed by a network node, the method comprising:

receiving, from another network node, an indication of a type of, capability of, configuration of, and/or feature supported by a wireless communication device to be paged, wherein receiving the indication comprises receiving a paging message that requests the network node to page the wireless communication device, wherein the indication is included in the paging message, wherein the indication comprises, or is included in, a UE Radio Capability for Paging information element, wherein the indication indicates whether, or that, the wireless communication device to be paged is a Reduced Capability (RedCap) User Equipment (UE);

making a paging decision based on the received indication, wherein the paging decision is made based also on information indicating:

whether or not wireless communication devices that have the type, capability, configuration, and/or feature indicated by said indication are barred from camping on, accessing, or attempting access to one or more certain cells; and/or in which one or more cells wireless communication devices that have the type, capability, configuration, and/or feature indicated by said indication are, or are not, barred from camping, accessing, or attempting access; and controlling paging of the wireless communication device according to the paging decision.

2. The method of claim 1, wherein the paging decision is a decision as to at least one of any one or more of:

whether the wireless communication device is, or is not, to be paged;

whether the wireless communication device is, or is not, to be paged in a certain cell;

in which one or more cells, if any, the wireless communication device is or is not to be paged; and whether to request another network node to page the wireless communication device.

3. The method of claim 1, wherein the paging decision is a decision as to in which one or more cells, if any, the wireless communication device is or is not to be paged, and wherein said controlling comprises:

paging the wireless communication device in one or more cells in which the wireless communication device is to be paged according to said decision; and/or refraining from paging the wireless communication device in one or more cells in which the wireless communication device is not to be paged according to said decision.

4. The method of claim 1, wherein the paging decision is a decision as to whether to request another network node to page the wireless communication device, and wherein the method further comprises requesting, or refraining from requesting, the another network node to page the wireless communication device according to the decision.

5. The method of claim 1, wherein making the decision comprises making the decision to:

page the wireless communication device in a cell served by the network node if the indication indicates the wireless communication device is a RedCap UE and if RedCap UEs are not barred from camping on, accessing, or attempting access to the cell; or refrain from paging the wireless communication device in a cell served by the network node if the indication indicates the wireless communication device is a RedCap UE and if RedCap UEs are barred from camping on, accessing, or attempting access to the cell.

6. The method of claim 1, wherein making the decision comprises making the decision to:

request another network node to page the wireless communication device in a cell served by the another network node if the indication indicates the wireless communication device is a RedCap UE and if RedCap UEs are not barred from camping on, accessing, or attempting access to the cell; or refrain from requesting another network node to page the wireless communication device in a cell served by the another network node if the indication indicates the wireless communication device is a RedCap UE and if RedCap UEs are barred from camping on, accessing, or attempting access to the cell.

7. A method performed by a network node, the method comprising:

transmitting, to another network node, an indication of a type of, capability of, configuration of, and/or feature supported by a wireless communication device to be paged, wherein transmitting the indication comprises transmitting a paging message that requests the other network node to page the wireless communication device, wherein the indication is included in the paging message, wherein the indication comprises, or is included in, a UE Radio Capability for Paging information element, wherein the indication indicates whether, or that, the wireless communication device to be paged is a Reduced Capability (RedCap) User Equipment (UE); and transmitting, to the another network node, information indicating:

whether or not wireless communication devices that have the type, capability, configuration, and/or feature indicated by said indication are barred from camping on, accessing, or attempting access to one or more certain cells; and/or in which one or more cells wireless communication devices that have the type, capability, configuration, and/or feature indicated by said indication are, or are not, barred from camping, accessing, or attempting access.

8. The method of claim 7, wherein the information indicates:

whether or not wireless communication devices that are Reduced Capability (RedCap) User Equipments (UEs) are barred from camping on, accessing, or attempting access to one or more certain cells; and/or in which one or more cells wireless communication devices that are RedCap UEs are, or are not, barred from camping, accessing, or attempting access.

9. A network node comprising:

communication circuitry; and processing circuitry configured to:

receive, from another network node, an indication of a type of, capability of, configuration of, and/or feature supported by a wireless communication device to be paged, wherein receiving the indication comprises receiving a paging message that requests the network node to page the wireless communication device, wherein the indication is included in the paging message, wherein the indication comprises, or is included in, a UE Radio Capability for Paging information element, wherein the indication indicates whether, or that, the wireless communication device to be paged is a Reduced Capability (RedCap) User Equipment (UE);

make a paging decision based on the received indication and on information indicating:

whether or not wireless communication devices that have the type, capability, configuration, and/or feature indicated by said indication are barred from camping on, accessing, or attempting access to one or more certain cells; and/or in which one or more cells wireless communication devices that have the type, capability, configuration, and/or feature indicated by said indication are, or are not, barred from camping, accessing, or attempting access; and control paging of the wireless communication device according to the paging decision.

10. A network node comprising:

communication circuitry; and processing circuitry configured to:

transmit, to another network node, an indication of a type of, capability of, configuration of, and/or feature supported by a wireless communication device to be paged, wherein the processing circuitry is configured to transmit the indication by transmitting a paging message that requests the other network node to page the wireless communication device, wherein the indication is included in the paging message, wherein the indication comprises, or is included in, a UE Radio Capability for Paging information element, wherein the indication indicates whether, or that, the wireless communication device to be paged is a Reduced Capability (RedCap) User Equipment (UE); and transmit, to the another network node, information indicating:

whether or not wireless communication devices that have the type, capability, configuration, and/or feature indicated by said indication are barred from camping on, accessing, or attempting access to one or more certain cells; and/or in which one or more cells wireless communication devices that have the type, capability, configuration, and/or feature indicated by said indication are, or are not, barred from camping, accessing, or attempting access.

11. The method of claim 1, wherein the paging decision is made based also on information indicating for how long wireless communication devices that have the type, capability, configuration, and/or feature indicated by said indication are barred from camping on, accessing, or attempting access to one or more certain cells.

12. The method of claim 7, wherein the information further indicates for how long wireless communication devices that have the type, capability, configuration, and/or feature indicated by said indication are barred from camping on, accessing, or attempting access to one or more certain cells.

13. The network node of claim 9, wherein the processing circuitry is configured to make the paging decision based also on information indicating for how long wireless communication devices that have the type, capability, configuration, and/or feature indicated by said indication are barred from camping on, accessing, or attempting access to one or more certain cells.

14. The network node of claim 10, wherein the information further indicates for how long wireless communication devices that have the type, capability, configuration, and/or feature indicated by said indication are barred from camping on, accessing, or attempting access to one or more certain cells.

* * * * *